United States Patent [19]

Chande et al.

[11] Patent Number: 5,173,947
[45] Date of Patent: Dec. 22, 1992

[54] CONFORMAL IMAGE PROCESSING APPARATUS AND METHOD

[75] Inventors: Alhad M. Chande, Columbia; Charles K. Snell, Baltimore, both of Md.

[73] Assignee: Martin Marietta Corporation, Bethesda, Md.

[21] Appl. No.: 387,954

[22] Filed: Aug. 1, 1989

[51] Int. Cl.$^5$ .................. G06K 9/36; G06K 9/56; G05B 15/00; G05B 19/18
[52] U.S. Cl. .................................. 382/41; 382/27; 395/122; 395/124; 364/133
[58] Field of Search .................. 382/41, 42, 43, 44, 382/45, 46, 47, 27; 364/900, 133, 413.13, 522; 395/119, 122, 124

[56] References Cited

U.S. PATENT DOCUMENTS

| | | | |
|---|---|---|---|
| 4,449,201 | 5/1984 | Clark | 364/900 |
| 4,739,474 | 4/1988 | Holsztynski | 364/200 |
| 4,901,360 | 2/1990 | Shu et al. | 382/49 |
| 4,908,751 | 3/1990 | Smith | 382/41 |

OTHER PUBLICATIONS

"Model-Based Recognition in Robot Vision", Chin et al, *Computing Surveys*, vol. 18, No. 1, Mar. 1986.
"Building an Environment Model Using Depth Information", Roth-Tabak et al, *Computer*, Jun. 1989.
"Using Occupancy Grids for Mobile Robot Perception and Navigation", Elfes, *Computer*, Jun. 1989.
"Three-Dimensional Shape Recognition Method Using Ultrasonics for Manipulator Control System", Tsujimura et al, Journal of Robotic Systems, vol. 3, No. 2, Summer 1986.
"Autonomous Intelligent Machines", Iyengar et al, *Computer*, Jun. 1989.
R. Jain, "Environment Models and Information Assimilation", The University of Michigan, May 29, 1989, pp. 1–24.

*Primary Examiner*—David K. Moore
*Assistant Examiner*—Michael Cammarata
*Attorney, Agent, or Firm*—Gay Chin; Michael L. Slonecker; Frederick G. Michaud, Jr.

[57] ABSTRACT

A conformal image processing apparatus and method in which image information is quantized into volume elements which are represented and stored in an array in such a fashion as to preserve their positional and orientational correlations. Data thus stored may be easily manipulated to model a number of three-dimensional operatoins on sensed objects and volumes.

39 Claims, 17 Drawing Sheets

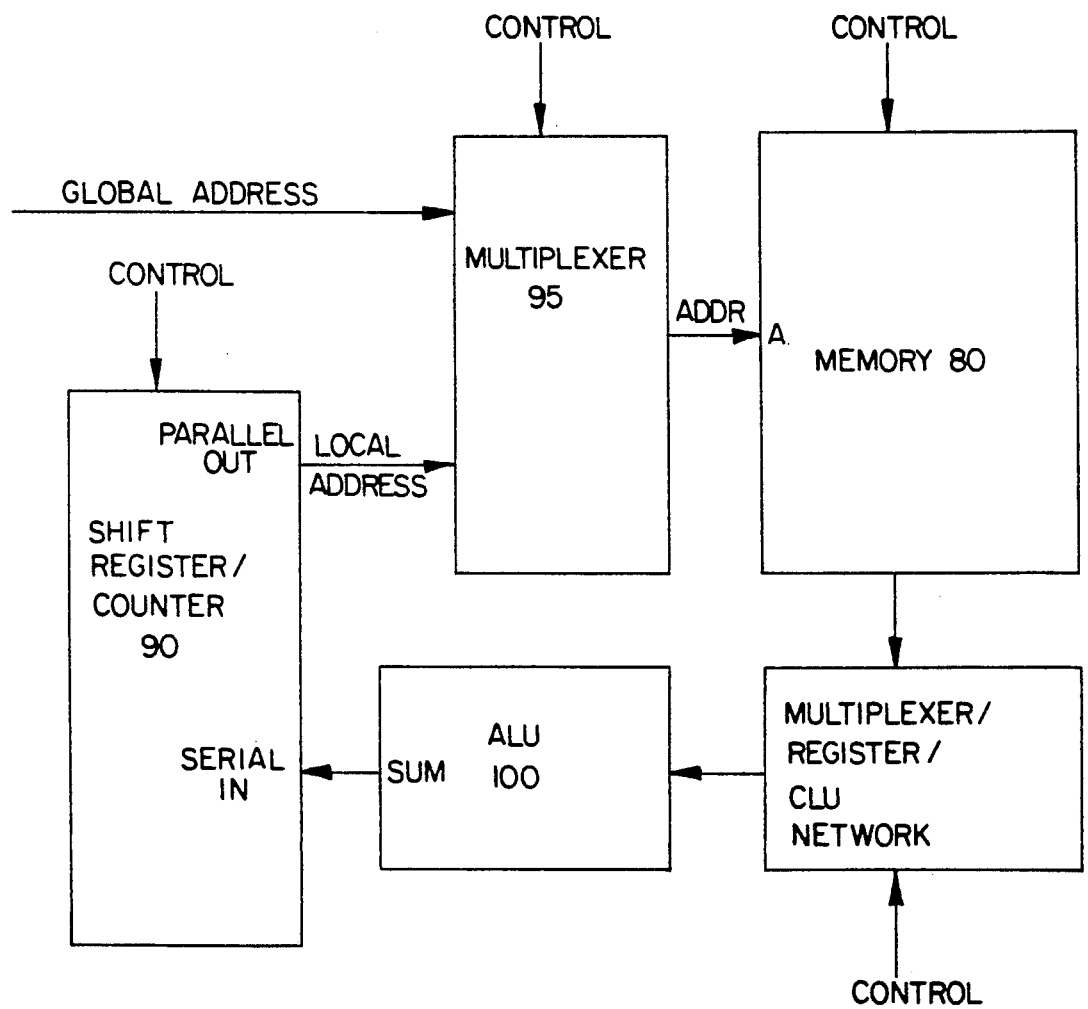
F I G. 6

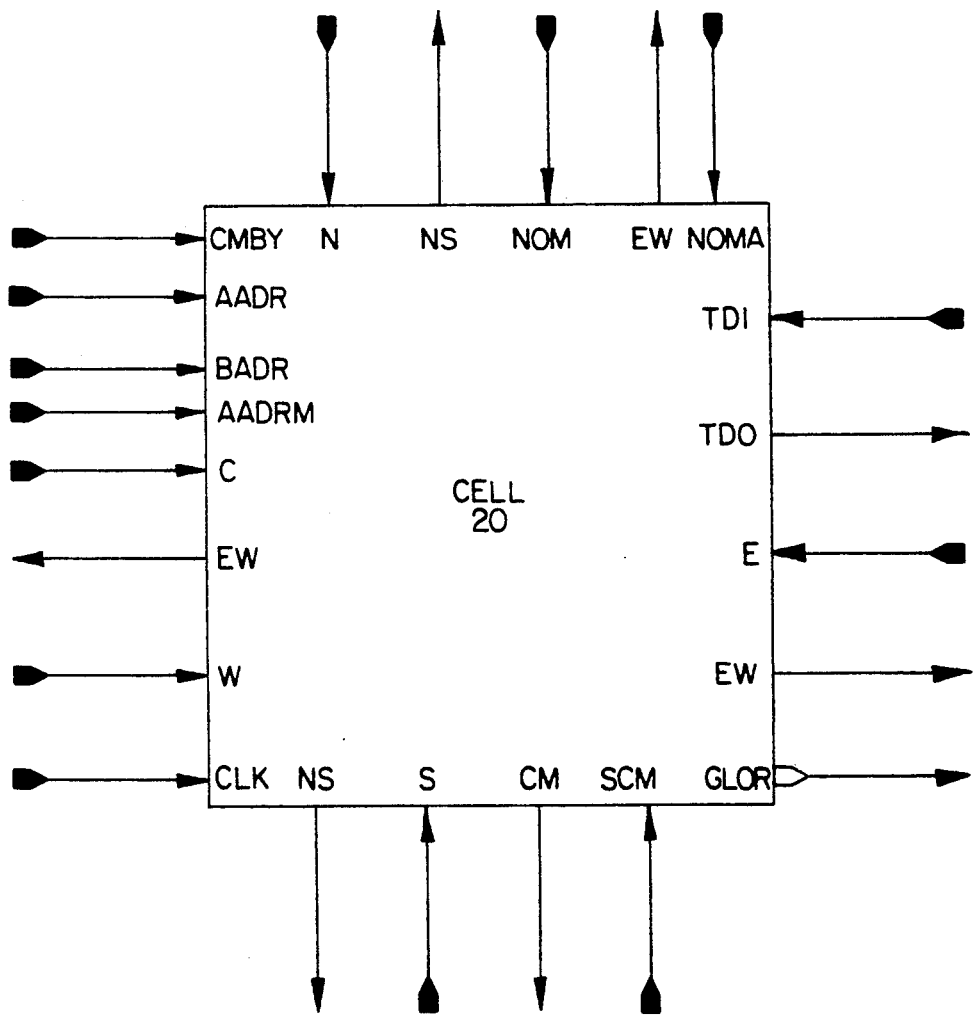
F I G. 8

CONFORMAL IMAGE PROCESSING APPARATUS AND METHOD

BACKGROUND OF THE INVENTION

1. Field of the Invention

This invention pertains to conformal, three-dimensional, volumetric data processing, as for computer vision, in particular as implemented on a parallel or systolic data processor comprised of individual bit serial processors.

2. Background Art

Prior attempts at processing and storing three-dimensional volumetric data have been severely limited for several reasons. Among these is the loss of information at the image-capture level (2-D image storage) with attendant propagation of such losses during further processing. Efforts to avoid this limitation have traditionally involved the introduction of additional system overhead in the form of increasingly complex hardware or software or both. Such efforts have been hindered, however, by a lack of synergism between hardware and software.

Contemporary three-dimensional volumetric methods have also dealt with a viewpoint independent object-centered representation of an "object space" whereas two-dimensional methods are normally viewer-centered such that objects in the image are represented in an "image-space". See, for example, R.T. Chin et al, "Model Based Recognition in Robot Vision", *ACM Computing Surveys*, Vol. 18, No. 1 (March 1986). Transition from two to three dimensions can be computationally intensive, a drawback which can be compounded by an essentially arbitrary choice for a frame of reference in each case.

To complicate matters even further, so-called "2½-D" techniques are sometimes used to try to exploit the best features of both 2-D and 3-D representations by using a "surface-space" definition. The resultant necessity of "fusing" partial surfaces, which in some cases may be separated by missing portions, requires in turn computationally time consuming "tagging" of different frames of reference for the different surfaces having varying orientations in the surface-space and identification of the possible associations between the surfaces.

The net result of all of this is that image processing systems have been slow and highly memory intensive.

In a more specific environment, sensor data fusion based on SONAR (SOund Navigation And Ranging) and LIDAR (LIght Detection And Ranging) requires reconstruction of images in a conformal, three-dimensional manner.

SUMMARY OF THE INVENTION

There thus exists a need for a conformal image processing system and apparatus providing for processing of data pertaining to three-dimensional objects while preserving the conformity of the object data or of partial surface patch data. This yields the ability to perform a visuo-spatial reconstruction of the object, which in turn greatly simplifies operations such as translations, rotations, sectioning, projection onto two-dimensional surfaces, scaling within tolerance bands, matching, feature extraction (such as mass from density values), three-dimensional reconstruction from tomographic data, three-dimensional histograms, and 2½ dimensional incremental surface reconstruction.

These and other advantages are achieved in the present invention through the use of a two-dimensional array of single-bit single-instruction stream, multiple-data stream (SIMD) processing elements or "cells", each connected to its nearest neighbors. The array may, for example, be a rectangular matrix of n columns and m rows, so that all cells except those on the edge have four nearest neighbors. The cells all operate under the control of a master controller to execute the same instruction concurrently on respective bits which are generally of equal significance. (If the cell has a local address generation capability as described below, the same operation may be performed on bits not necessarily of equal significance.) Each cell is provided with sufficient memory and address generation capability that the array as a whole is capable of storing data relating to a three-dimensional image of an object or surface in a conformal manner. The image data can then be processed in a highly parallel manner. The method and apparatus according to the present invention are especially well suited to spatial manipulations of three-dimensional object representations as quantized volume elements or surface elements in their entirety.

In particular, in one aspect the present invention is an apparatus for storing data relating to a plurality of voxels in a three-dimensional space extending a characteristic number A of voxels in an a-dimension and a characteristic number B of voxels in a b-dimension, comprising an array of N processing cells, N being the product of A and B, each of the cells being uniquely associated with a respective pair of coordinates a,b in the three-dimensional space and having a memory capable of storing a condition indicator for each voxel having coordinates a,b, and means connected to the array for storing the data relating to the voxels such that a cell associated with a given pair of coordinates a,b stores in its memory in a predetermined order the condition indicator for each voxel having coordinates a,b.

BRIEF DESCRIPTION OF THE DRAWINGS

These and other features and advantages of the invention will become apparent from the following written description read in conjunction with the drawings, in which:

FIG. 6 is a diagram illustrating an operation of the local address generation function of the cell of FIG. 2;

FIG. 8 is a diagram showing I/O connections for a typical cell as shown in FIG. 2;

DETAILED DESCRIPTION OF THE PREFERRED EMBODIMENTS

The invention will now be described in connection with several preferred embodiments. The invention should not, however, be considered as limited to these embodiments.

The invention will also be described for clarity with reference to a particular coordinate system, specifically, cartesian coordinates x,y,z, used in conjunction with a rectangular array. It will be apparent to one having ordinary skill in the art, however, that for some applications a noncartesian coordinate system such as spherical or cylindrical coordinates may be more natural or simplify various operations. Methods based on such coordinate systems or apparatus based on nonrectangular arrays should therefore also be considered to be within the contemplation of the invention.

Preferred Array and Cell Structure

General principles of operation of a rectangular array of identical cells are set forth in U.S. Pat. No. 4,739,474 to Holsztynski et al, the specification of which is hereby incorporated by reference.

An array which is particularly well suited to implementing the invention is the ASAP (Advanced Systolic Array Processor) developed by Martin Marietta Aero and Naval Systems, described and claimed in U.S. patent application Ser. No. 254,853, filed Oct. 7, 1988 and assigned to the same assignee as this application. Features of this system which make it especially useful include its north, south, east, and west connectivity (with a wraparound capability), capability for internal arithmetic and logic operations, extensive internal memory for each cell, and the capability within each cell for local address generation. The invention will therefore be described as it would be implemented in this system. It will be understood by one having ordinary skill in the art, however, that the invention could also be implemented on other systems.

Figure 1:
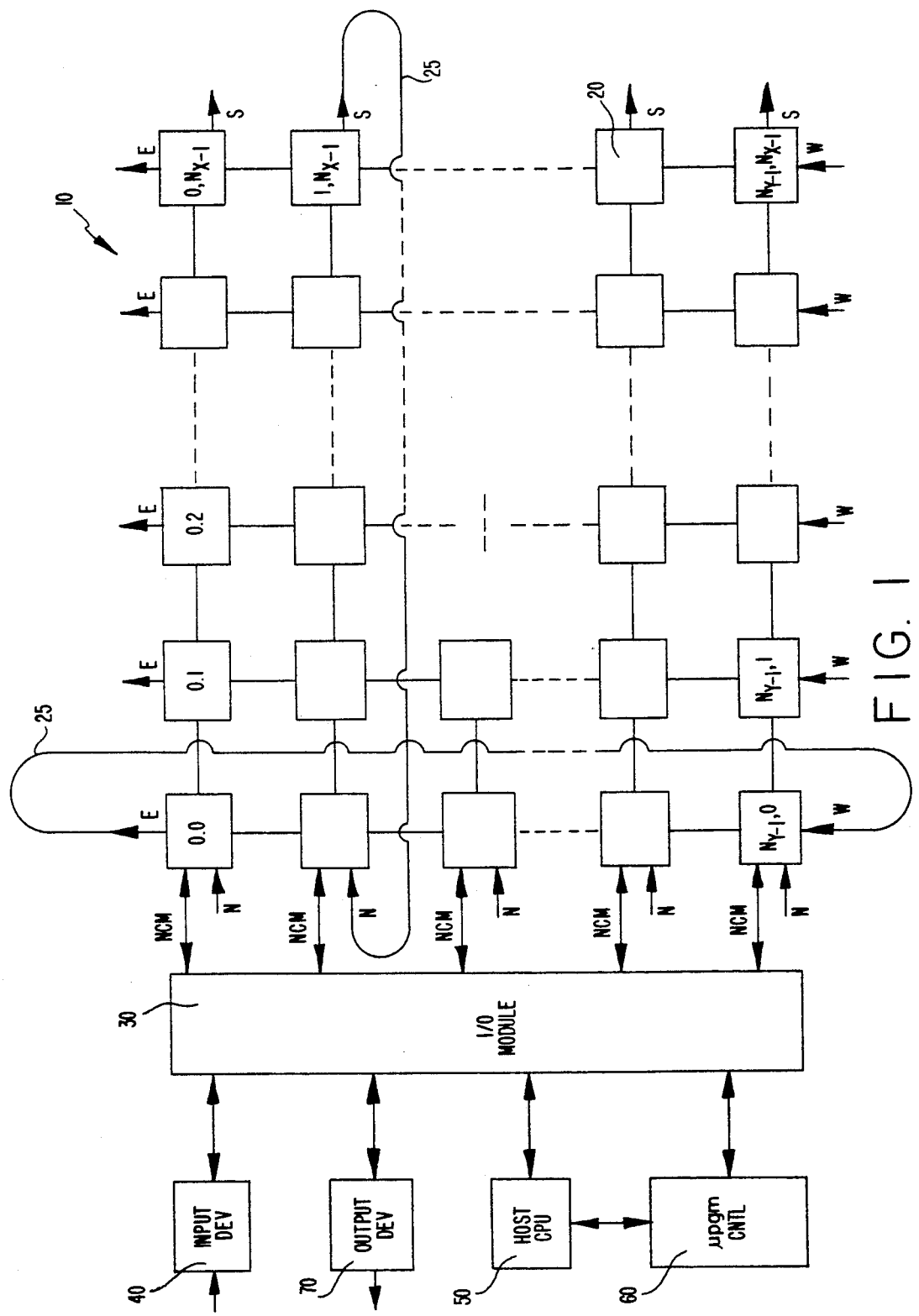
FIG. 1 is a block diagram of a preferred embodiment of a parallel bit serial data processor according to the present invention.

FIG. 1 shows an array 10 comprised of $N_x$ columns and $N_y$ rows of cells 20. Each cell 20 is uniquely identified by a pair of coordinates x,y specifying its row and column in the array 10. Also, each direction is specified by a compass point, with N, S, E, and W corresponding to left, right, up, and down in the FIG. 1. These compass points will be used to maintain consistency in orientation.

A wraparound connection 25 permits opposite edges of the rectangular mesh to be joined. Although for clarity only one such connection is shown for each of the two axes (i.e., N-S and E-W), it is to be understood that in general there are sufficient wraparound connections 25 to connect each edge cell to an edge cell on an opposite edge The wraparound connections 25 thus together permit opposite edges of the array to be joined, resulting in a toroidal virtual topology for the array.

The arrangement of FIG. 1 also includes an I/O unit 30. This I/O unit 30 accepts data from an input device 40 or a host computer 50 and transposes it into bit serial format for loading into the array 10 under the control of a master controller 60. The I/O unit 30 may be any suitable electronic device for interfacing the array 10 with other equipment. For example, this unit may include controllable input and output buffers for temporarily storing data before and after processing in the array 10. The I/O unit 30 also extracts data from the array 10 and reconstitutes it as necessary for use by an output device 70 or host computer 50.

A master controller 60 is also connected by connections, omitted for clarity, to each cell 20 of the array 10 to provide control and address signals.

The I/O unit 30 communicates with the array 10 through a set of edge cells. In the embodiment of FIG. 1, the north edge cells $(0,0 - Ny-1)$ are used. The data is then shifted into adjoining cells, an operation which is repeated under the control of master controller 60 until each cell 20 contains a bit of equal significance. Once the data is loaded into the cell, the cell can perform arithmetic and logical operations on it, and store the result internally using a globally or locally generated address. Data may then be shifted back out to I/O unit 30 through the NCM I/O ports.

Alternate data I/O between I/O unit 30 and array 10 can be made through the N,S,E,W, or SCM I/O ports by reconfiguration of connections.

FIG. 1 also shows a bidirectional NCM (North Communications) port. This port is bidirectional and differs from the N port also in that it operates independently of the cells' arithmetic and logical functions, as described more fully below.

Figure 2:
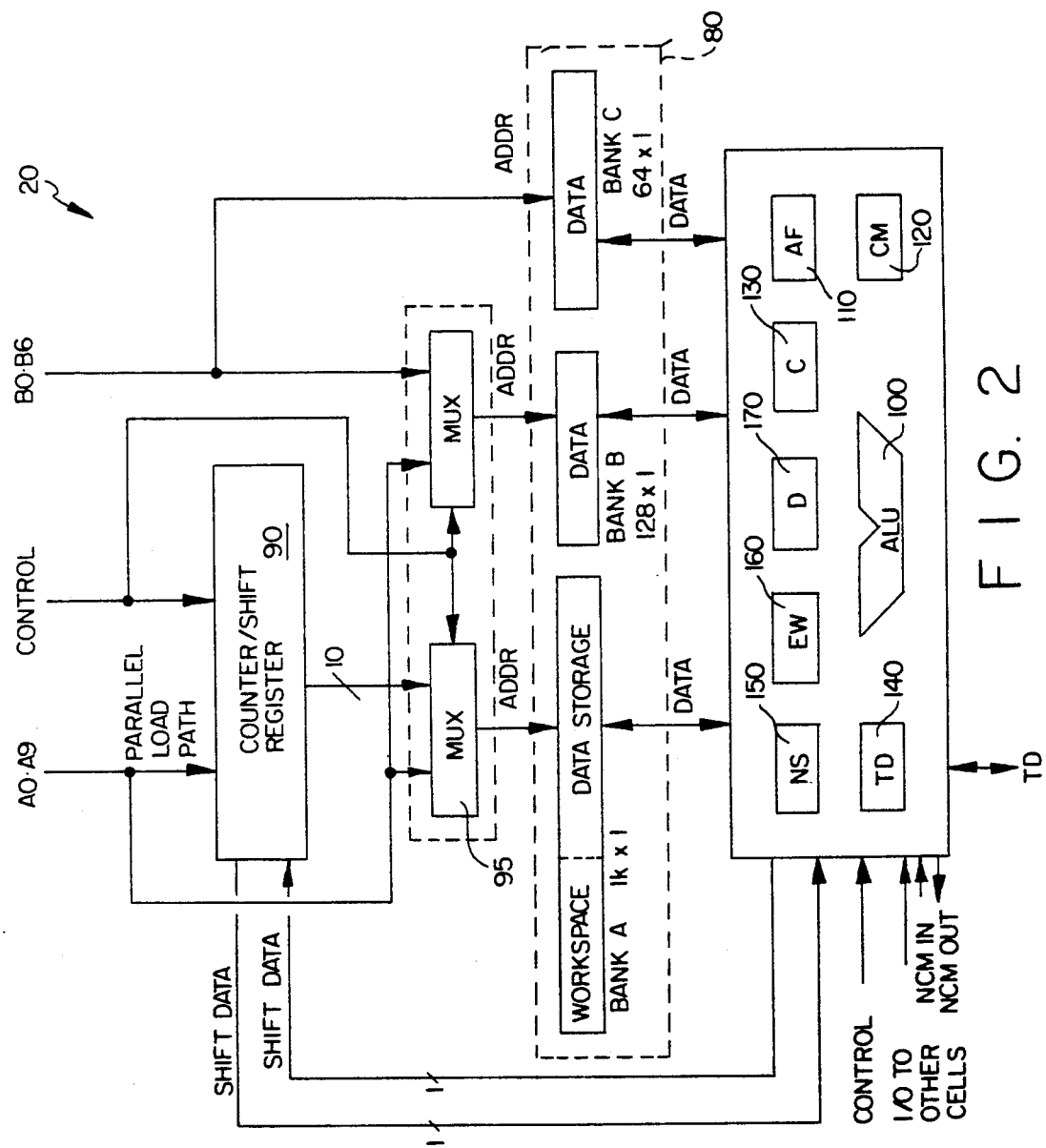
FIG. 2 is a block diagram of a preferred embodiment of a cell for a parallel bit serial data processor according to the present invention.

FIG. 2 is a block diagram of a presently preferred internal architecture of a cell 20 according to the invention. As can be seen therein, the cell 20 includes a memory 80 which in the preferred embodiment is a static random access memory (RAM). There are preferably three segments to the memory, one which is $1024 \times 1$, another which is $128 \times 1$, and a third which is $64 \times 1$, which combine for a total of $1216 \times 1$ bits of memory. It will be understood by one of ordinary skill in the art, however, that a different segmentation scheme could be used, e.g., the memory could have one, two, or some other number of segments. The cell 20 also contains 17 registers, 10 of which are used in a shift register/counter (SR/C) 90, and the others of which will be described below. The registers are positive edge triggered devices all continuously clocked from a common source. Each register can hold its state indefinitely as required by the master controller 60. Data transfer between registers is effected in one clock cycle. The cell 20 also contains various multiplexers and a single bit ALU or adder 100, all of which will be described below.

As mentioned above, memory 100 preferably has 1216 bits of static memory. These are divided into three blocks designated Bank A or RAM0 ($1024$ bits $\times 1$ bit), Bank B or RAM1 ($128 \times 1$), and Bank C or RAM2 ($64 \times 1$). The three segments have a common data input port. The first and largest segment RAM0 can be addressed globally (extracellular) via address lines A0–A9 (AADR(00:09)) or locally (intracellular) via parallel output from the SR/C 90. RAMI can be addressed via address lines A0–A6 (AADR(00:06)) or B0–B6 (BADR(00:06)). A global multiplexer generates the address for RAM1. RAM2 has only one address source, global address B6 (BADR(00:06)). A global address is common to all cells in the array.

Figure 4:
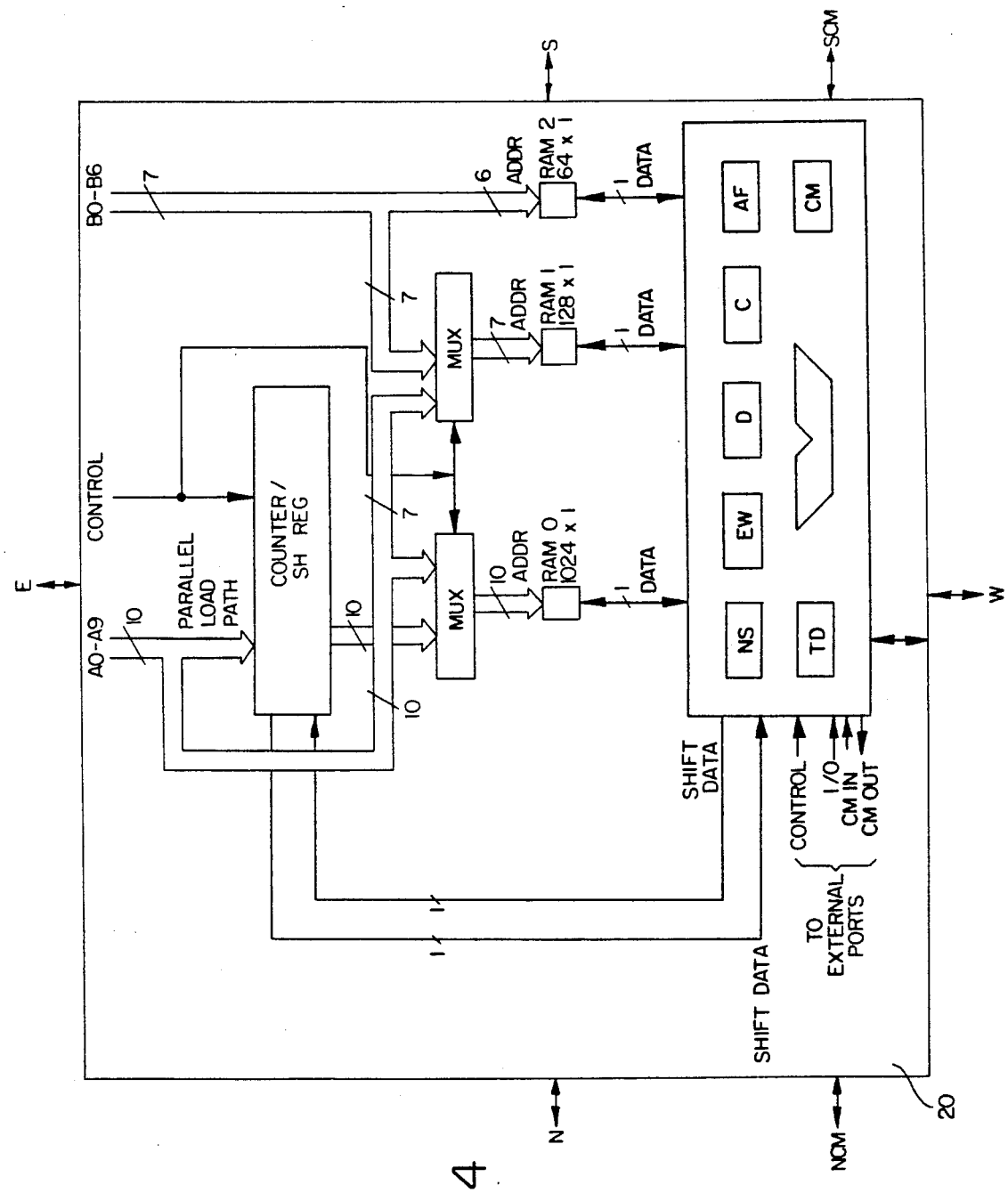
FIG. 4 is an isometric schematic showing the functional blocks of the cell of FIG. 2.
Figure 5:
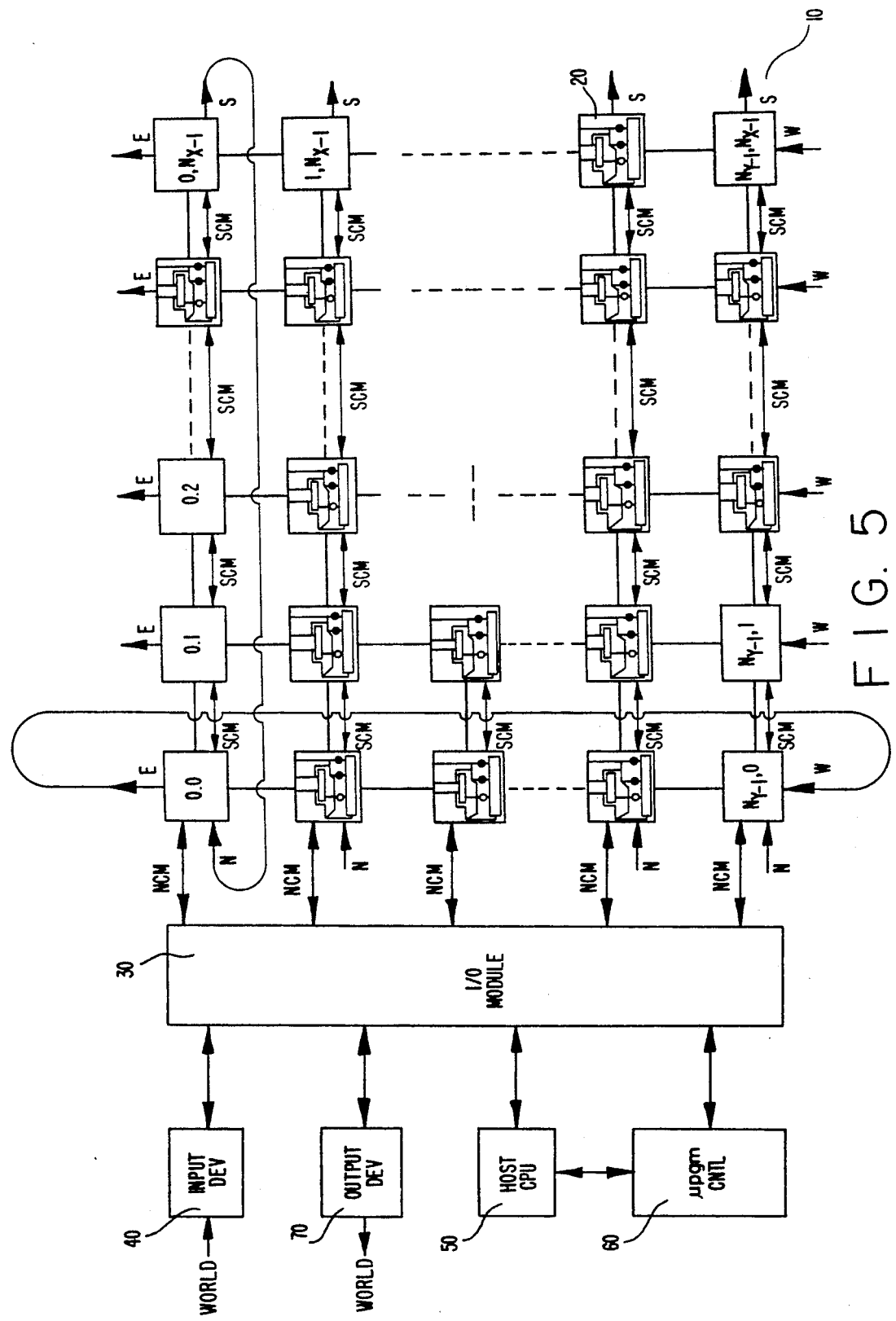
FIG. 5 is an isometric schematic of an array of cells shown in FIG. 2.

FIG. 4 is an isometric schematic showing the functional blocks of the cell 20 giving a physical interpretation of the relationship between the memory segments, and, in particular, the "orthogonal extension" of RAM0 with respect to the plane of the cell and array FIG. 5 gives a similar isometric schematic of an array of cells 20.

Figure 3:
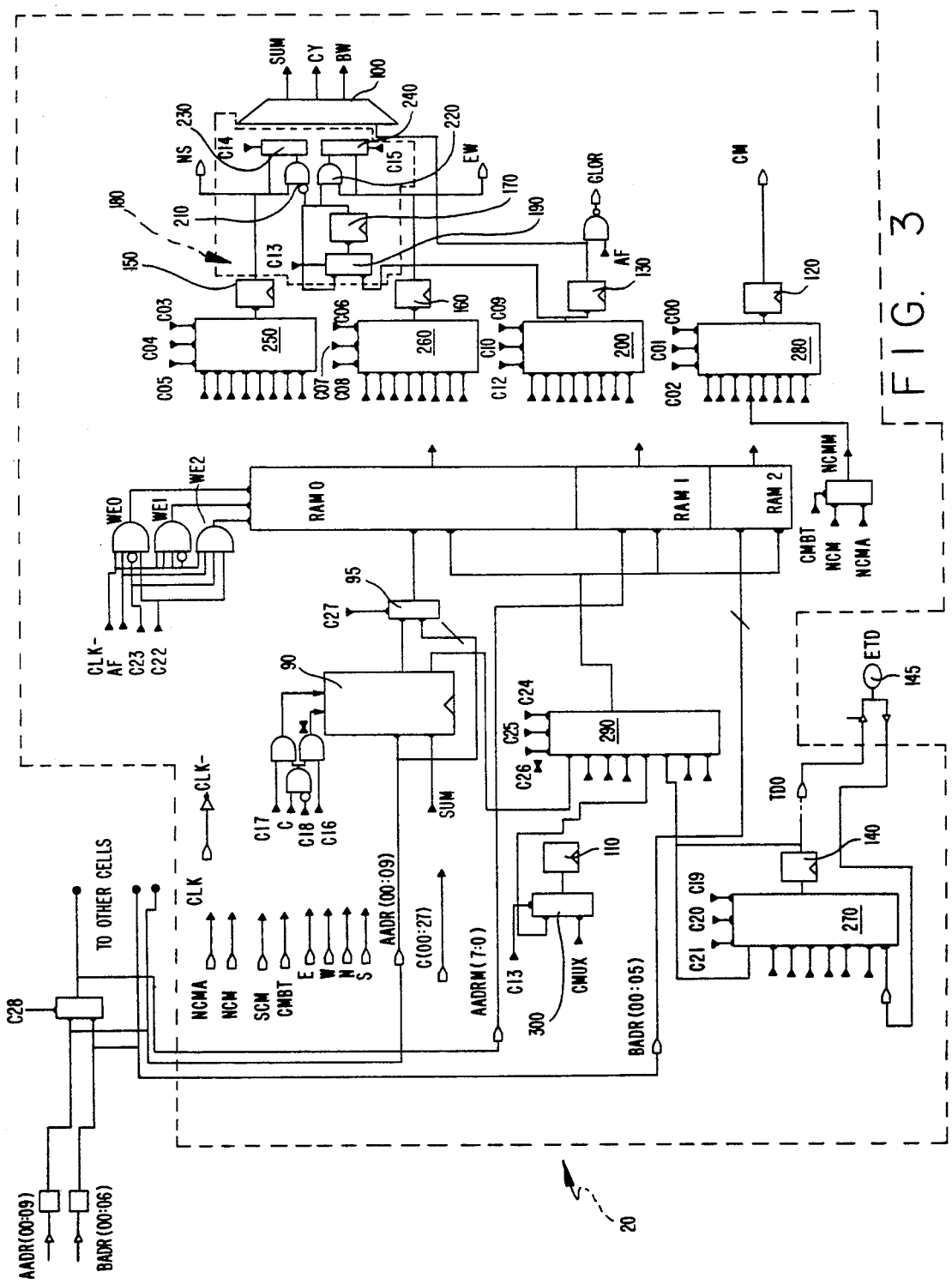
FIG. 3 is a more detailed diagram of the embodiment of a FIG. 2.

Only one segment may be written into in any given clock cycle. Which RAM segment is written into depends on control lines C22 and C23, as shown in FIG. 3. It also depends on an AF value stored in an "Activity Flag" or "AF" register, as described below. Briefly, if the AF value is zero, indicating a deactivated cell, writes to the memory 80 are disabled.

The memory 80 may receive data from the serial output of SR/C 90, the sum, carry, or borrow output of ALU 100, or from the AF register 110, a Communication (CM) register 120, a Carry (C) register 130, or a Third Dimension (TD) register 140. These last three registers will be described in more detail below. Any memory attached to each Third Dimension port 145 would constitute an augmentation of the "orthogonal extension" represented by RAM0.

The segmented nature of the preferred embodiment of the memory 80 permits simultaneous read/write operations. Although only one segment can be written into in any given clock cycle, data can be read from the other two segments which are not being written. If no segment is being written, then all three segments can be read. Data from all three segments can be loaded directly into the TD register 140 and the CM register 120, as well as into an NS register 150 and an EW register 160. The C register 130 and a D register 170 can obtain data from RAM0 directly, but cannot obtain data directly from RAM1 or RAM2.

It has been mentioned above that the cell 20 also preferably contains a 10-bit shift register/counter SR/C 90. This element is a means for generating effective address signals locally. The 10 bit parallel output of the SR/C 90 is connected to the address input of RAM0 through an address multiplexer 95 to provide the cell 20 with local addressing capability for RAM0. The SR/C 90 also provides a serial shift register input to any of the three segments of the memory 80 through a multiplexer 290 shown in FIG. 3.

The serial output port of the SR/C 90 is the most significant bit of the register. This output can be written into any of the three segments of the memory 80.

The SR/C 90 can be loaded through a serial input port or a parallel input port provided thereon. The parallel input port is connected to the AADR address bus. The serial input port is connected to the sum output of the ALU 100. The sum output can be used to load the SR/C 90 from the memory 80. In other words, data can pass from the memory 80, along an appropriate path through the network of multiplexers, registers, and gates to the ALU 100 then pass through the ALU 100 unchanged to be loaded into the SR/C 90 through its serial input.

It is also possible, however, to have the ALU 100 perform an arithmetic or logical operation on the address data. Such as operation is illustrated in FIG. 6. Initially, address data may be loaded into memory 80 externally through the address multiplexer 95. This address data and data representing an offset value may then be passed along to the ALU 100 which adds them and passes the resultant effective address to the SR/C 90. SR/C 90 may then be incremented, under either global or local control, in order to access multiple bit words through the address multiplexer 95. Each is bit stored sequentially in the memory 80.

In a more advanced utilization, the offset value or effective address may be calculated from the data set. This powerful but logically simple innovation thus allows independent addressing of the memory 80 for each cell, within an SIMD environment as a function of predefined address offsets or as data dependent address offsets.

The cell 20, as mentioned above, also includes an ALU 100. In a preferred embodiment, the ALU 100 is a single-bit full adder, subtractor with conditional control of the input operands. The details of this conditional logic are shown in FIG. 3. Therein, it can be seen that a conditional logic unit or CLU 180 includes an input multiplexer 190 with an input connected to the output of a C multiplexer 200 and to the output of the D register 170. The input multiplexer 190 is controlled by an appropriate control signal. Its output is connected to the input of the D register 170. The output of the D register 170 is connected to a first logic gate 210 and a second logic gate 220. In the embodiment of FIG. 3, these are both AND gates. One input of the first logic gate 210 is connected to the NS register 150; the other is connected to the D register 170 and, in the embodiment of FIG. 3, is an inverting input. One input of the second logic gate 220 is also connected to the input of the D register 170. The other is connected to the EW register 160.

The CLU 180 also includes a first output multiplexer 230 and a second output multiplexer 240. The inputs for the first output multiplexer 230 are the outputs of the NS register 150 and the first logic gate 210. The inputs for the second output multiplexer 240 are the outputs of the EW register 160 and the second logic gate 220.

The CLU 180 allows for conditional arithmetic operation and conditional selection operation on the NS value of the NS register 150 and the EW value of the EW register 160 based on the D value of the D register 170. This leads to great simplification of operations such as multiplication.

The sum, carry, and borrow output from the CLU 180 can be written into any one of the three segments of the memory 80 within one clock cycle. The sum output can also be loaded into the TD register 140, or the carry and borrow outputs can be loaded into the C register 130.

The TD register 140 allows each cell 20 to communicate with an external device bidirectionally. The TD register 140 can be loaded from any one of the three segments of memory 80, the sum output from the ALU 100 the C register 130, the CM register 120, and from an external bidirectional port 145. The contents of the TD register 140 can also be held. The contents of the TD register can be written into memory, loaded into the EW register 160, loaded into the NS register 150, or transferred to the external bidirectional I/O port 145. These data transfers from the TD register can occur in parallel. Communication with an external device and intercell communication (e.g., via the CM register 120) can occur simultanously.

Figure 7:
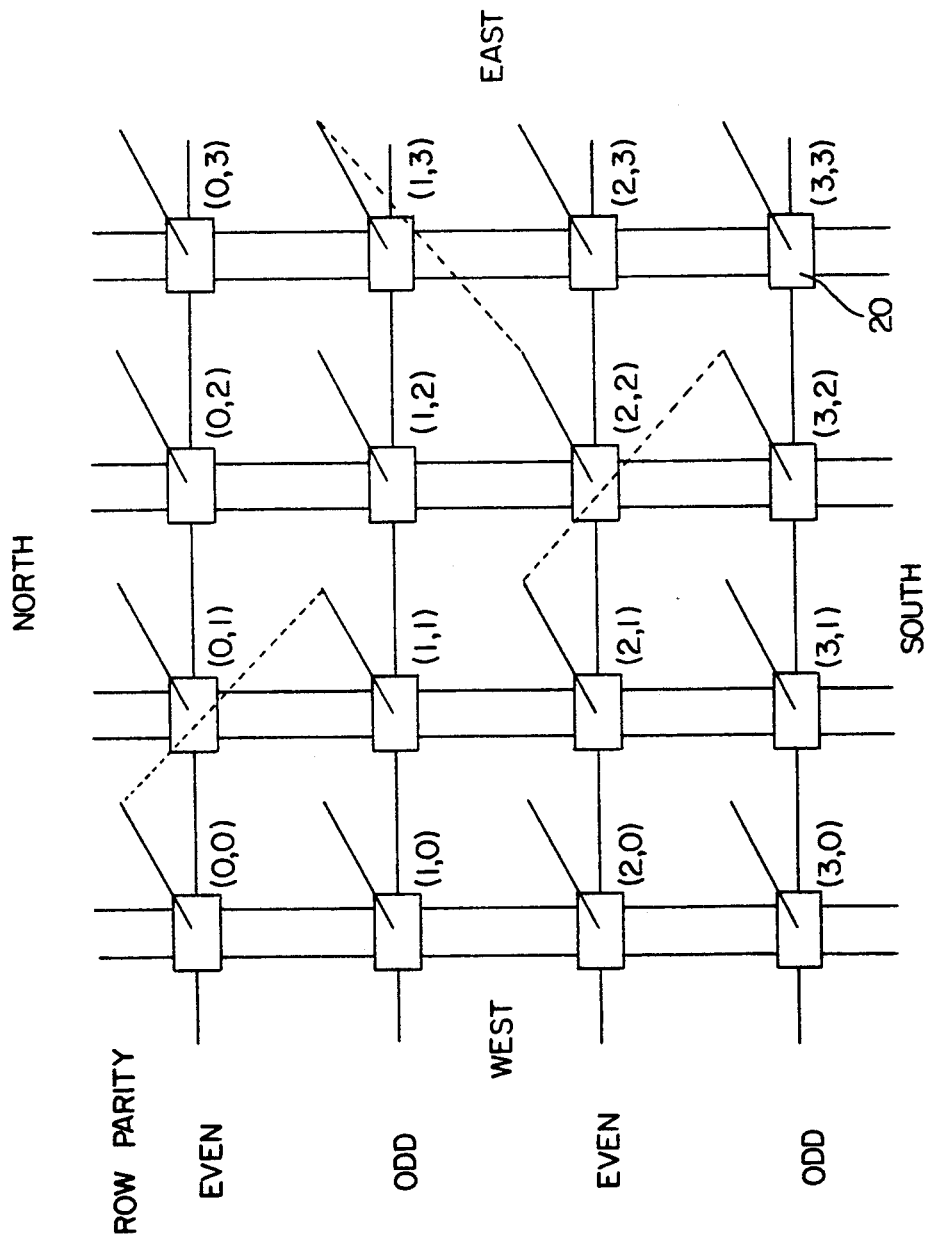
FIG. 7 is a schematic diagram showing a pattern of cell interconnection using cells according to a preferred embodiment of the present invention.

The TD registers 140 of cells 20 can also be connected directly. In one arrangement, the cells 20 are partitioned into even rows and odd rows. FIG. 7 gives an example of a 4×4 array in which rows have been assigned "parity". The third dimension register 140 can thus be configured to such a way as to allow communication between cells which are not nearest neighbors. This is accomplished by modifying the control signals affecting the TD registers 140 and physically connecting TD I/O ports 145 together.

The NS register 150 is available both from within the cell and external to the cell. The external cell output is provided to source data to the north or south of any given cell. The NS register 150 can be loaded from one of eight sources, one of which is a hold state. The other sources are the three segments of the memory 80, the EW register 160 the TD register 140, or from the N or S input ports as mentioned. The NS value retained in the NS register 150 is one of three operands for the ALU 100.

The EW register 160 is also available both within the cell 20 and external to the cell 20. The external cell output is provided as source data to the east or west of any given cell. This EW register 160 can also be loaded from any one of eight sources, one of which is a hold state. The other sources are the three segments of the memory 80, the NS register 150, the TD register 140, or the E or W input ports. The EW value retained in the EW register 160 is one of three operands for the ALU 100. If the operation of the ALU 100 is subtraction, then the EW register 160 retains the subtrahend operand.

The C register 130 is loaded via the C multiplexer 200 which is an 8:1 multiplexer. The C register 130 can be loaded from any one of eight sources, one of which is a hold state. The sources are the first segment of the memory 80, i.e., RAM0, the NS register 150, the EW register 160, the carry output of the ALU 100, the borrow output of the ALU 100, or a logical 0 or 1. The outputs of the C register 130 is not available external to the cell 20. The C value in the C register 130 is logically ANDed with the value of the AF register 110 and inverted to form the GLOR output signal of the cell 20. The cell is considered active if both the C value and the AF value are a logical 1. The C value is a direct input for the ALU 100's carry input signal and is one of the three operands for the ALU 100. The CM register 120 allows bidirectional communication along the north-south access without affecting the operations of the ALU 100. CM register 120's output is available both within the cell 20 and external to the cell 20. The CM register 120 can be loaded from any one of eight sources, one of which is a hold state. The other sources are any one of the three segments of the memory 80, the N and S communication ports, or a logical 0 or 1.

There may also be provision for global input to each cell in the given column. This is accomplished to the north CM global input as explained below.

As mentioned above, cell 20 is also provided with various multiplexers for controlling the source of data for the various registers and segments of memory 80. The C multiplexer 200 has already been mentioned. The cell 20 also includes 8:1 data multiplexers for the NS register 150, the EW register 160, the TD register 140, and the CM register 120. Respectively, these are the NS multiplexer, the EW multiplexer 260, the TD multiplexer 270, and the CM multiplexer 280. There is also an 8:1 multiplexer DIMUX 290 and an address multiplexer 95 associated with the memory 80.

The AF register 110 is loaded via the output of the C multiplexer 200 via an associated AF multiplexer 300 whose line select is controlled by an appropriate control signal. Writes to all three banks of the memory 80 are disabled if the AF value in the AF register 110 is 0. Also, the AF value is ANDed with the C value in the C register 130 and inverted to obtain the global output GLOR signal. This global output signal is used for global branch operations in the array. The output for the array is forced to logic 0 if any one of the cells 20 in the array is active.

Figure 9:
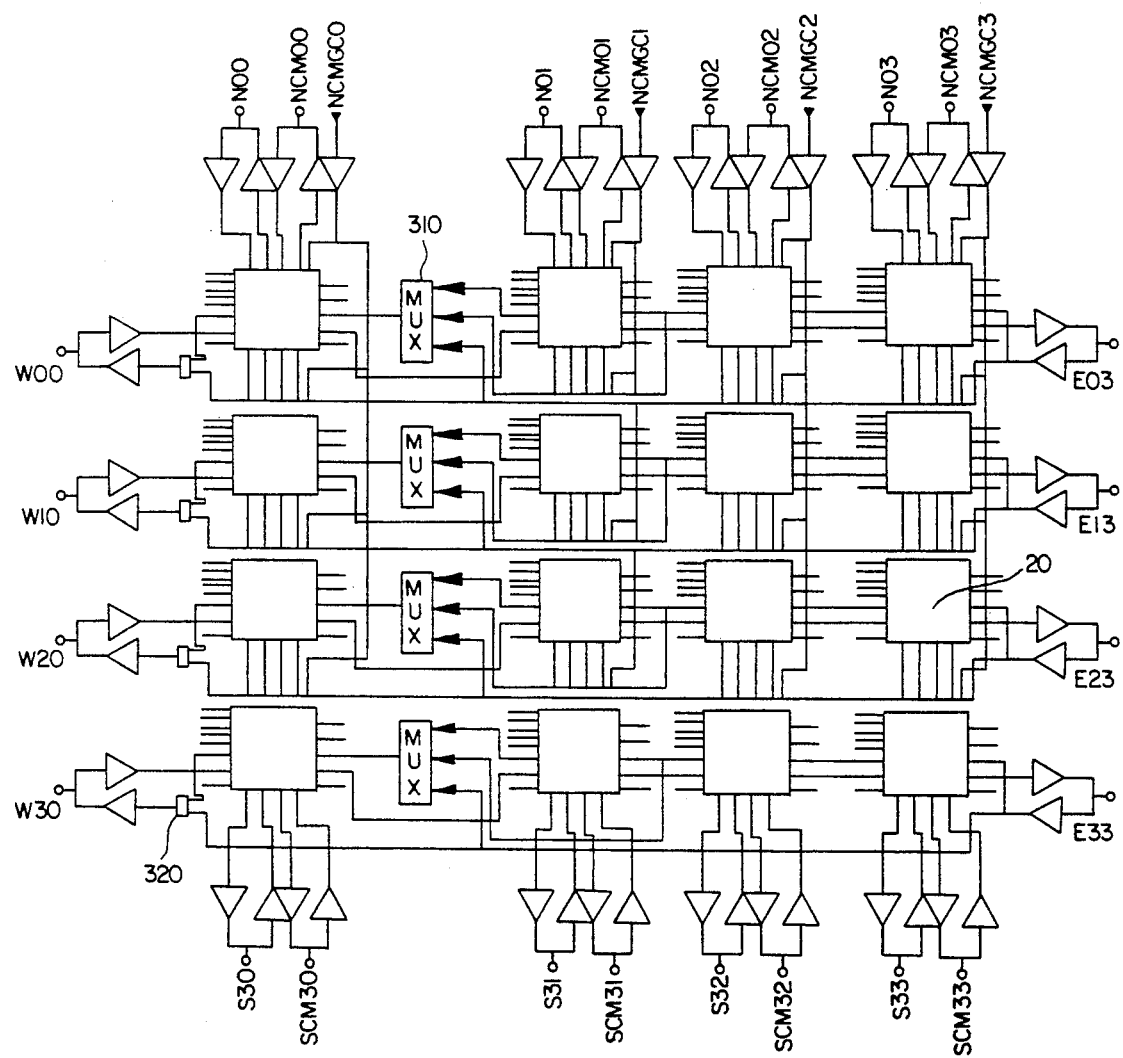
FIG. 9 is a functional block diagram of a 4×4 array of cells as shown in FIG. 8.

FIG. 9 shows a 4×4 array with cells having inputs as shown in FIG. 8. Each cell 20 has the capability of communicating with its nearest neighbors. There are bidirectional communication lines along the periphery of the 4×4 array to allow north to south, south to north, east to west, and west to east. Communication with another array or what may properly be regarded as another section of the same array if the 4×4 array depicted in FIG. 9 is regarded as being on one chip. Each cell 20 also preferably has the external I/O TD port 145 which allows communication with an external device. If an external device is used then each cell may be conceived of as having five nearest neighbors.

Figure 10:
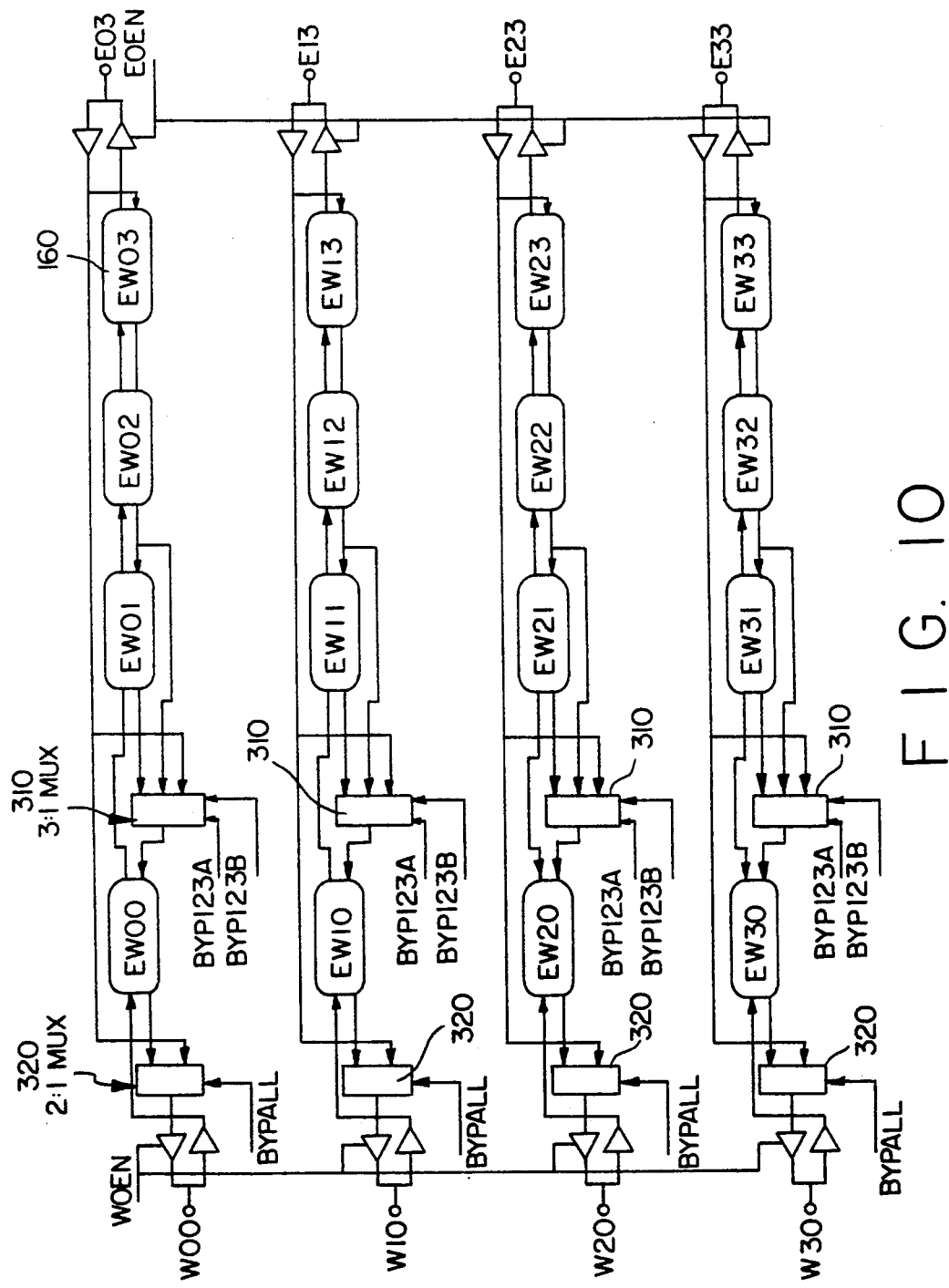
FIG. 10 is a schematic diagram of a bypass network included in an array according to a preferred embodiment of the present invention.
Figure 11:
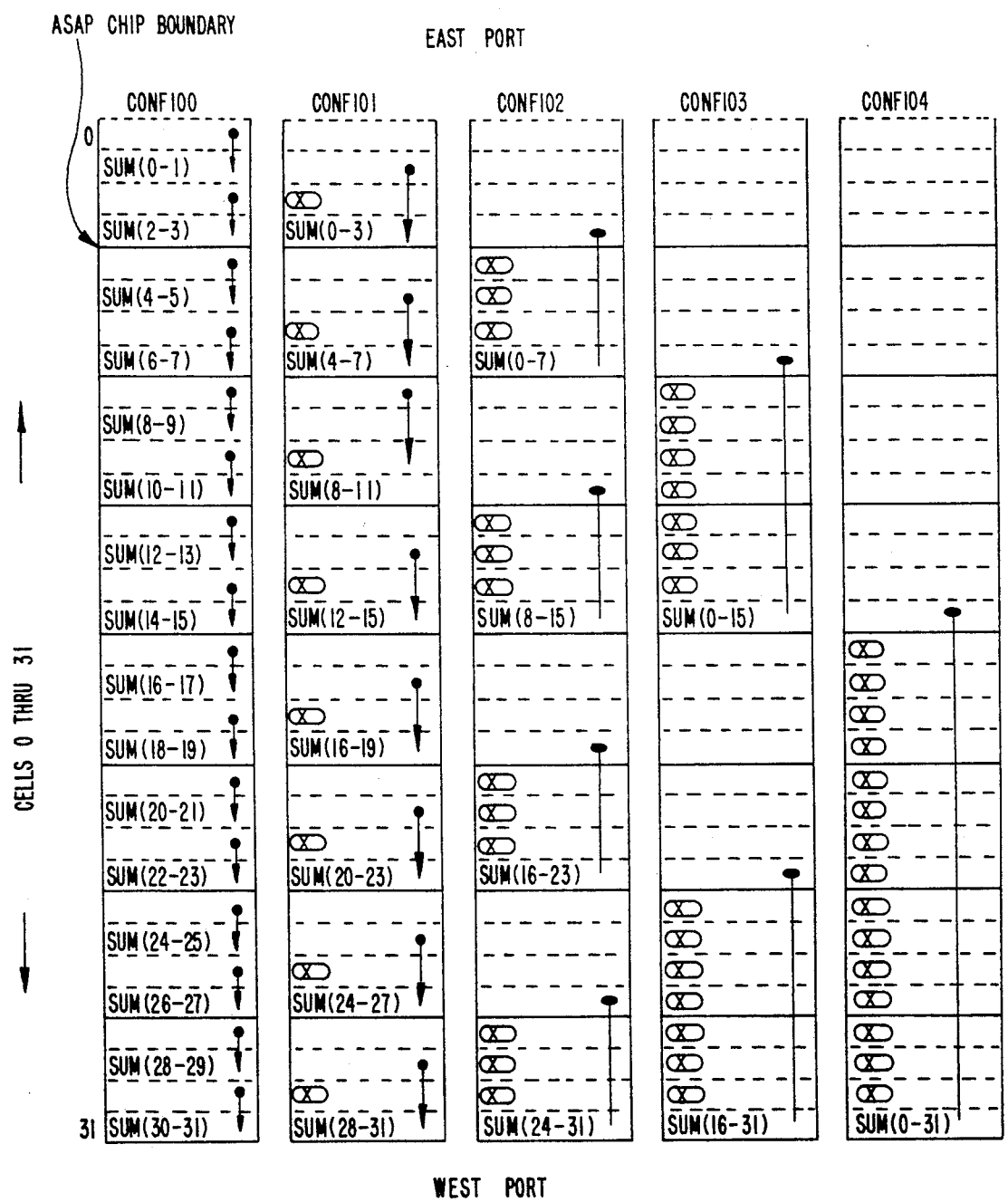
FIG. 11 is a diagram showing a particular application of the bypass network of FIG. 10.

As alluded to above, there are certain applications in which it is desirable to have a cell communicate with another cell which is not its nearest neighbor. According to another aspect of the invention, the cell interconnection may be reconfigured for such applications. For this purpose, various multiplexers are provided to allow different communication links east to west and north to south. For example, FIG. 10 shows an east to west multiplexer bypass network for a 4×4 array of cells. For clarity, only the EW register 160 of each cell has been shown. The network includes a 3:1 multiplexer 310 and a 2:1 multiplexer 320 for each row. The 3:1 multiplexer 310 in row 0, for example, has as its inputs the E port, the western output of cell 02, and the output of cell 01. Its output is supplied as the E register input of cell 00. The 2:1 multiplexer has as its input the western output of cell 00 and the E port. Thus, multiplexer 320 permits bypassing of the entire row. The arrangements for rows 1, 2, and 3 are similar. The multiplexers 310 and 320 are controlled by appropriate control signals from the master controller 60. This network is associated with every row of cells and is preferably unidirectional. It will be noted that it is possible to bypass the row entirely. A particular interconnection scheme is shown in FIG. 11.

Figure 12:
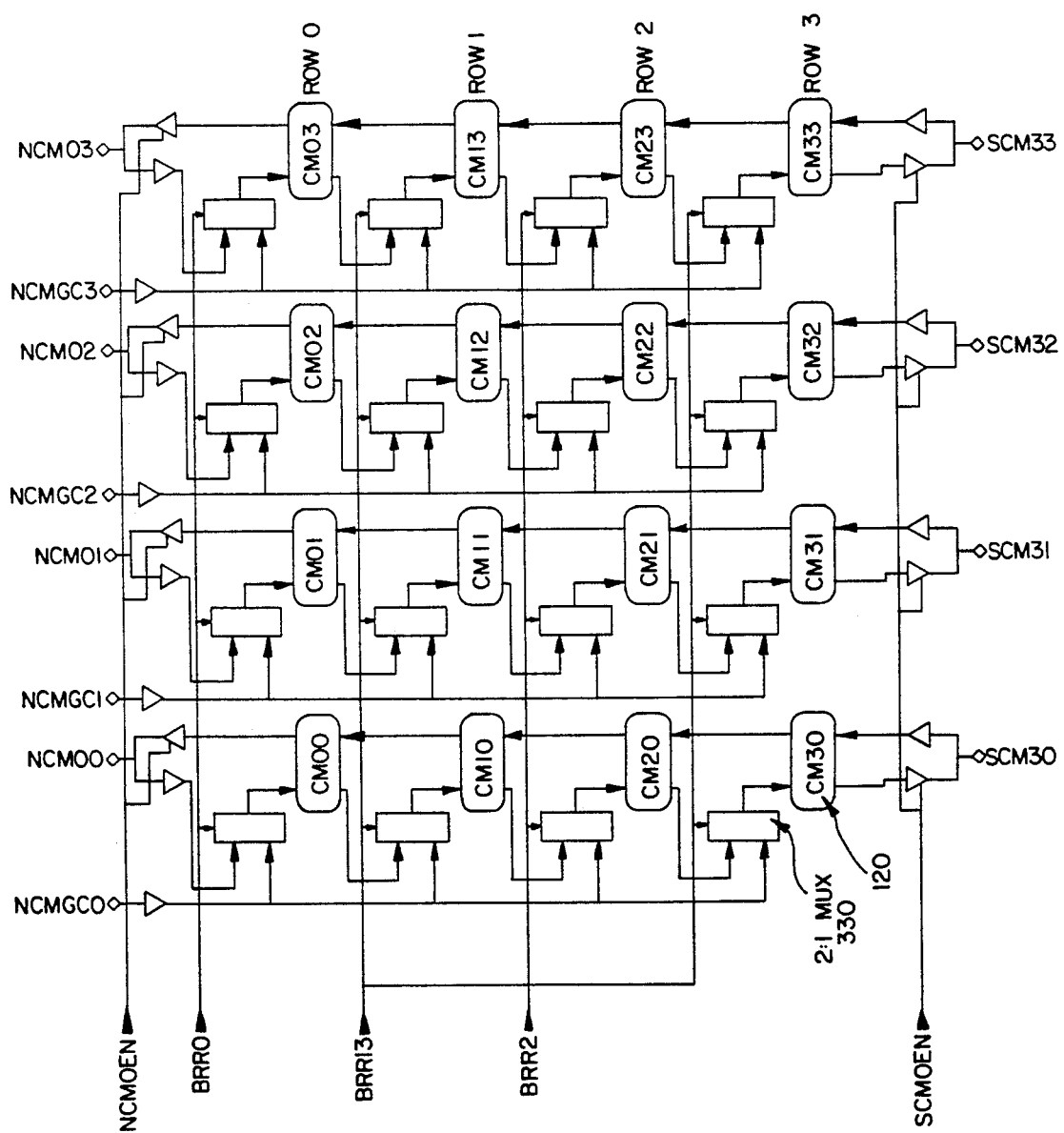
FIG. 12 is a schematic diagram of another bypass network included on an array according to a preferred embodiment of the present invention.

Other communication paths may be provided with associated bypass networks. For example, the CM communication path may have a bypass network as shown in FIG. 12. For clarity, a 4×4 array is shown, and each cell 20 is represented by its CM register 120. It will be understood, as before, however, that the array may be any size appropriate to an application, and that the CM register 120 is preferably interconnected to other components of the cell as described above. Intermeshed with the network formed of CM registers 120 is a network formed of a like number of 2:1 multiplexers 330. One input for each of the multiplexers 330 is the north global input for the column containing its associated cell. The other input for the northern edge cells is the column N input port. For the interior cells and the other edge cells, the other input is the CM register 120 of the nearest northern neighboring cell. Each multiplexer 330 presents its output to its associated CM register 120. The multiplexer 330 selects the active input according to appropriate control signals from the master controller 60.

The network of multiplexers 330 permits input data to be broadcast selectively in the NS direction. One bit of data may be distributed in one clock cycle to each cell of any number of columns. This significantly reduces the number of operations, and, hence, clock cycles for a number of functions. As an example, consider a matrix operation such as the multiplication of two matrixes A and B where B resides in the array. Rows of A may be broadcast across the array to effect the multiplication in fewer clock cycles than would be possible without this feature.

Array Loading and Data Structure

The foregoing describes a particular array processor which is especially well adapted to carry out the method of, and serve as part of the apparatus of, the present invention. The principles of the invention will now be described in connection with the array.

In a system according to the present invention, space is regarded as being subdivided or quantized into three-dimensional elements. These volume elements are commonly referred to in the image processing field as "voxels". They are most commonly cubic, but can be assumed to have a different elemental shape depending on factors such as simplification in view of the overall geometry of a particular application. The system maps the quantized space into the array memory such that each voxel has a unique memory space into which a condition indicator may be placed. For example, the presence of mass could be denoted as a binary 1 and the absence of mass as a binary 0. Alternatively, if a multi-bit representation is used as it might be to denote a gray scale, a corresponding number of memory spaces might be allocated for the voxel. The memory spaces are logically related to the physical relationship of the voxels in space, so that a natural and simple correlation is maintained.

For example, let it be assumed that a space has a characteristic range in an a-dimension of A, in a b-dimension of B, and in a c-dimension of C. Let a,b,c, correspond to x,y,z, respectively, and let the characteristic ranges define the edge lengths of a rectangular parallelepiped. The characteristic range for a particular space under consideration might be its maximum extent in that direction. There is thus defined a box-shaped space Q having a volume which is the product of A, B, and C. This is shown graphically in FIG. 13.

Figure 13:
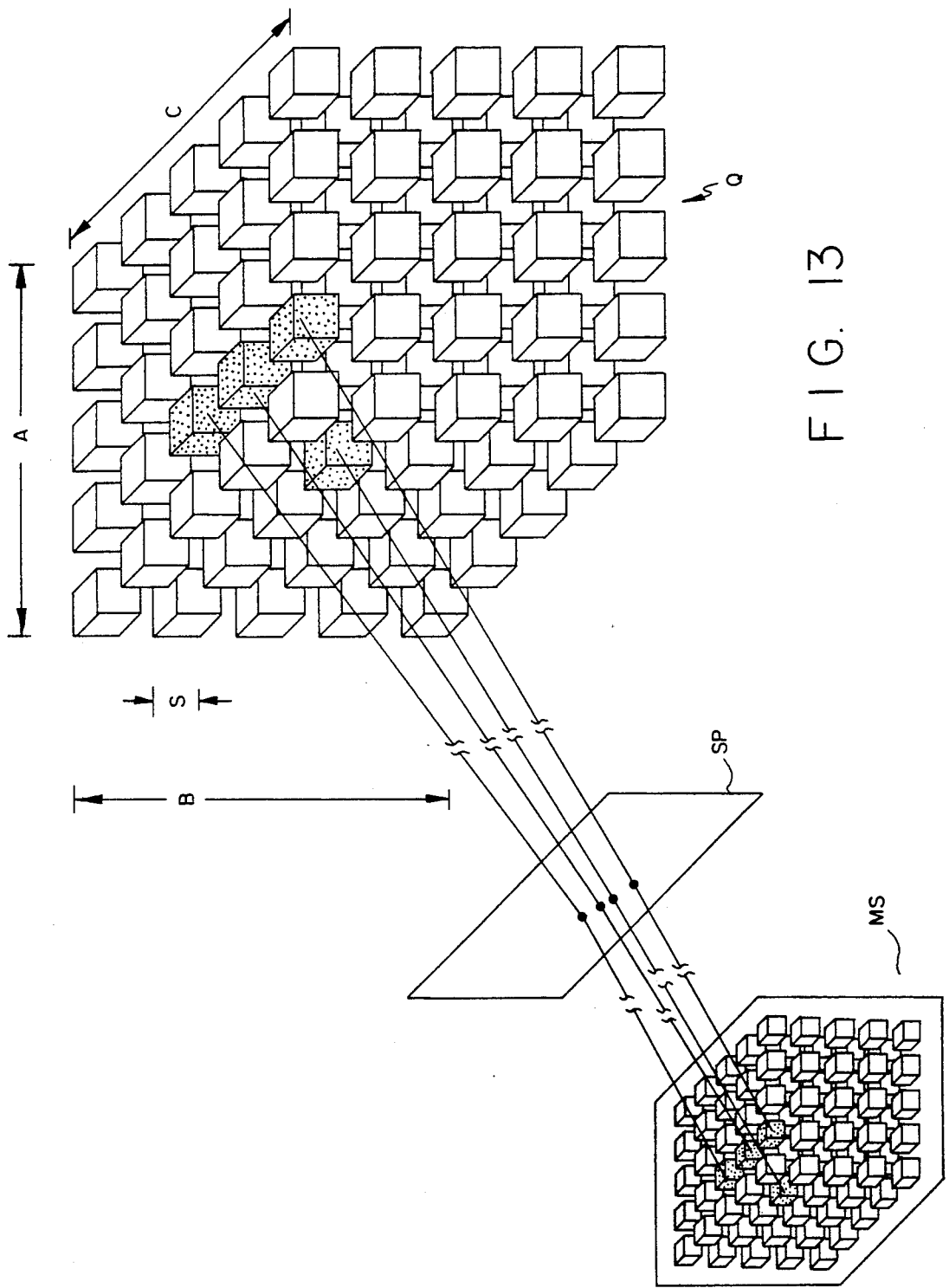
FIG. 13 is a graphical representation of space sampling according to the present invention.

Now let it be assumed that the space Q is quantized into volume elements having appropriate elemental shapes. This is also shown in FIG. 13, where the elemental shapes are space-filling, but are shown slightly spaced to make the figure easier to understand. For this application it is also assumed that the input device 40 is a sensor such as radar, sonar, a laser ranger or the like which has a resolution "s" in each coordinate direction. The sensor senses the space Q from a transducing sensor plane of reference SP. The resolution s is related to the number of voxels "N" in a given direction and the characteristic dimension A as follows:

$$\Sigma s_i = A$$

where the summation is carried out for i=1 to N. In the special case where all $s_i$ are equal, this relationship simplifies in three dimensions to the following set of equations:

$$N_x s_x = A$$

$$N_y s_y = B$$

$$N_z s_z = C$$

where $N_x$ is the number of voxels in the x-direction, and so on.

Figure 14:
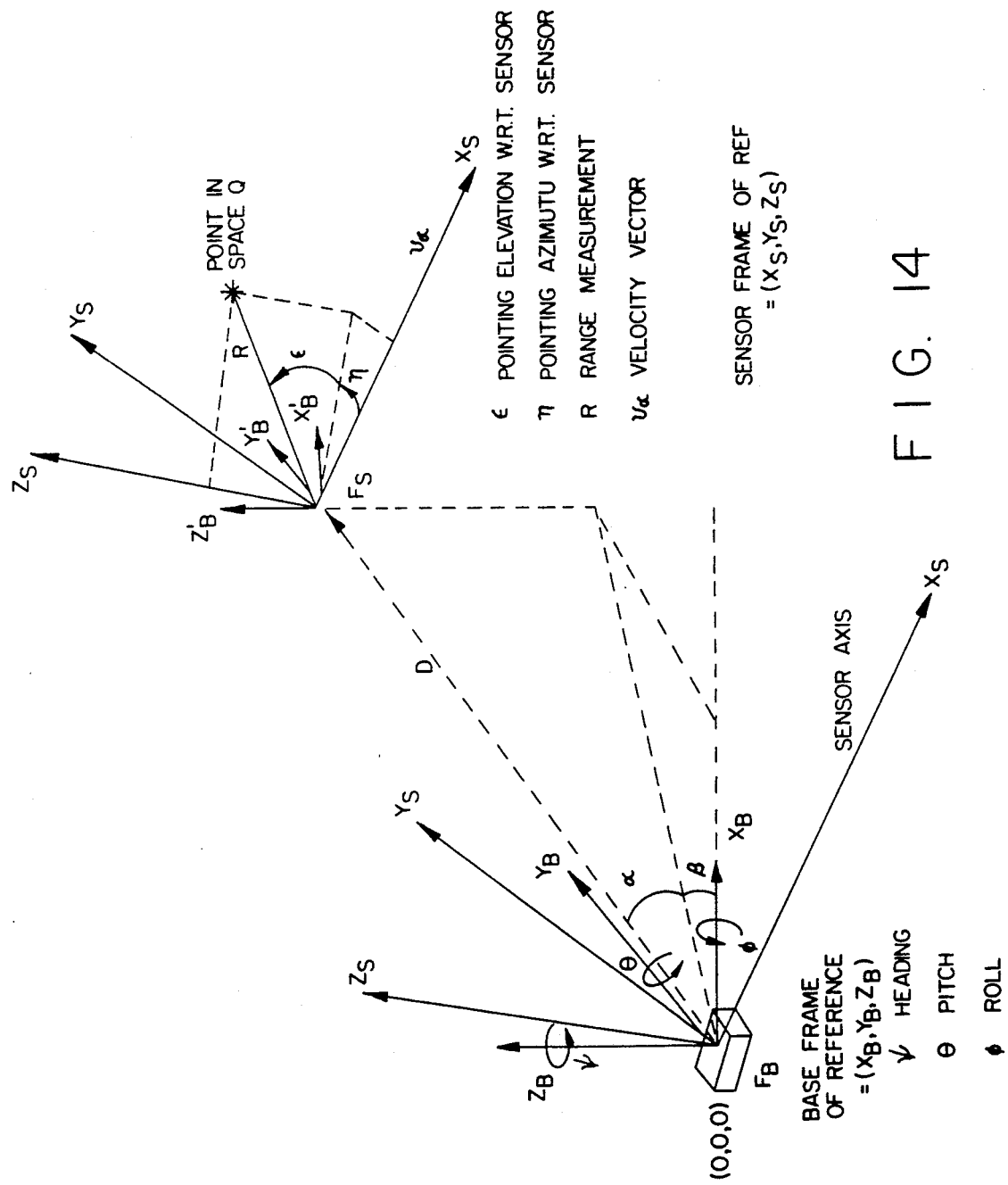
FIG. 14 is a graphic representation of the frames of reference utilized for range-to-voxel conversion according to the present invention.

The number of voxels is an important parameter in Range-to-Voxel Conversion (RVC). This is in essence a mapping of the space Q under consideration first to the sensor plane SP and then to a memory space MS at the processor or array frame. RVC uses ranging information, together with position and orientation of the sensor, to generate voxel positional and condition data. An example of this process is illustrated in FIG. 14. As can be seen, RVC involves a transformation from the sensor frame of reference FS to the array or absolute base frame of reference FB. The transformation operations involve both translation and rotation. The specific operators for carrying out these transformations are well known, and are given for the sake of completeness in the following table:

TRANSFORMATION TO BASE FRAME in NED (North East Down) Coordinate System; a Left Handed Coordinate System $$\begin{pmatrix} x_k \\ y_k \\ z_k \end{pmatrix} = T_1 T_2 T_3 T_4 T_5 \begin{pmatrix} x_k' \\ y_k' \\ z_k' \end{pmatrix} \text{ where}$$

$$T_1 = \begin{bmatrix} \cos \psi_k & -\sin \psi_k & 0 \\ \sin \psi_k & \cos \psi_k & 0 \\ 0 & 0 & 1 \end{bmatrix},$$

$$T_2 = \begin{bmatrix} \cos \theta_k & 0 & \sin \theta_k \\ 0 & 1 & 0 \\ -\sin \theta_k & 0 & \cos \theta_k \end{bmatrix},$$

$$T_3 = \begin{bmatrix} 1 & 0 & 0 \\ 0 & \cos \psi_k & -\sin \psi_k \\ 0 & \sin \psi_k & \cos \psi_k \end{bmatrix}$$

$$T_4 = \begin{bmatrix} \cos \eta_k & -\sin \eta_k & 0 \\ \sin \eta_k & \cos \eta_k & 0 \\ 0 & 0 & 1 \end{bmatrix},$$

$$T_5 = \begin{bmatrix} \cos \epsilon_k & 0 & \sin \epsilon_k \\ 0 & 1 & 0 \\ -\sin \epsilon_k & 0 & \cos \epsilon_k \end{bmatrix}$$

RVC can be performed by a special-purpose digital processor for high input data rates or by a general purpose CPU (such as the host CPU) for low input data rates. The result of RVC is that each voxel is assigned a label which is a unique combination of three indices, each lying within its respective range.

The array is chosen to have x,y dimensions (in terms of a number of cells in each direction) compatible with (i.e., not less than) the x,y dimensions (in terms of a number of voxels in each direction) of the space being sampled. Moreover, each cell is constructed to have a memory "height" or "depth" (in terms of number of allocations) compatible with (not less than) the z dimension (in terms of a number of voxels) of the space being sampled. It is also desirable that the memory of each cell be large enough to accommodate additional data such as intermediate results of operations or transformations.

The net result is that each voxel in real space has a corresponding analogue in the virtual memory space of the array, with the physical relative positioning and orientation of the voxels being mirrored in a virtual relative positioning and orientation of the memory space analogue. Thus, the relative positioning and orientation information is preserved implicitly in the memory structure of the array rather than explicitly as binary data. In other words, the memory space conforms to real space, with a scaled multiplier.

More specifically, the x-direction in space can be mapped onto the cells running along north-south direction of the array, the y-direction onto those running along the east-west direction of the array, and the z-direction onto the linear RAM in each cell. If a given voxel is labelled with indices (i,j,k) which are positive integers less than $N_x$, $N_y$, and $N_z$, respectively, then the condition indicator for a voxel (i,j,k) may be represented as a binary encoding located in RAM word k of cell (i,j).

Figure 15:
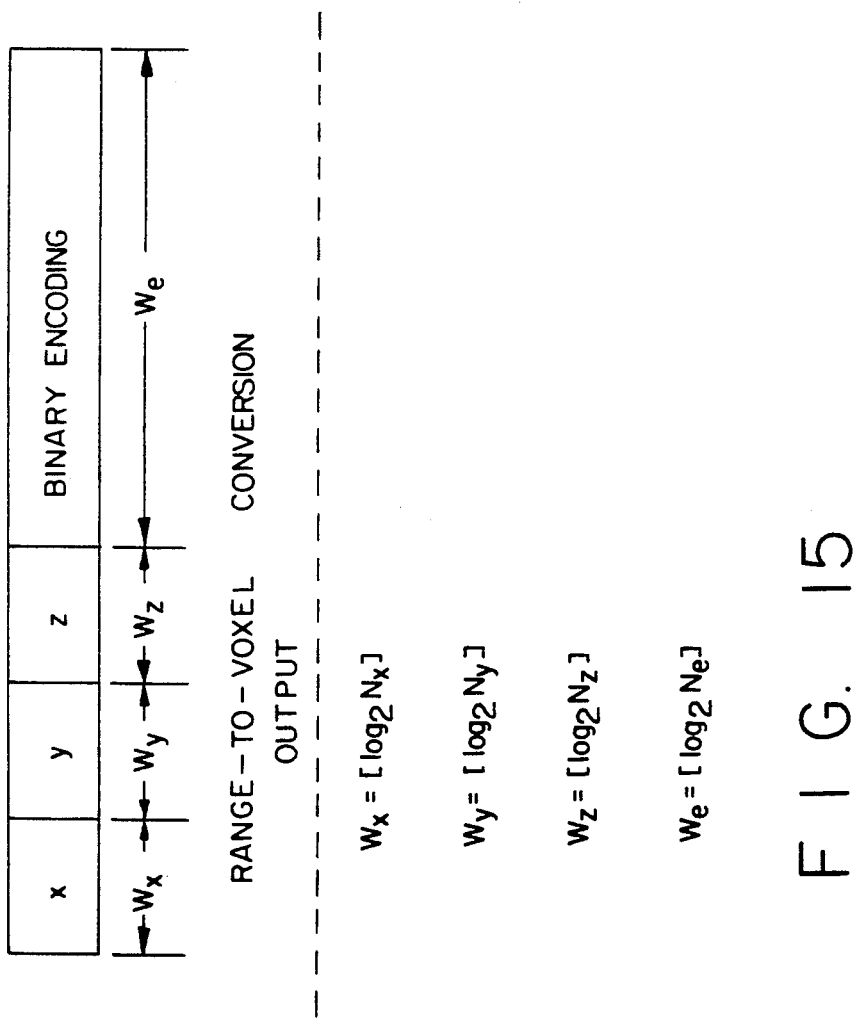
FIG. 15 is a graphic representation of a preferred Range-to-Voxel Conversion (RVC) output.
Figure 16:
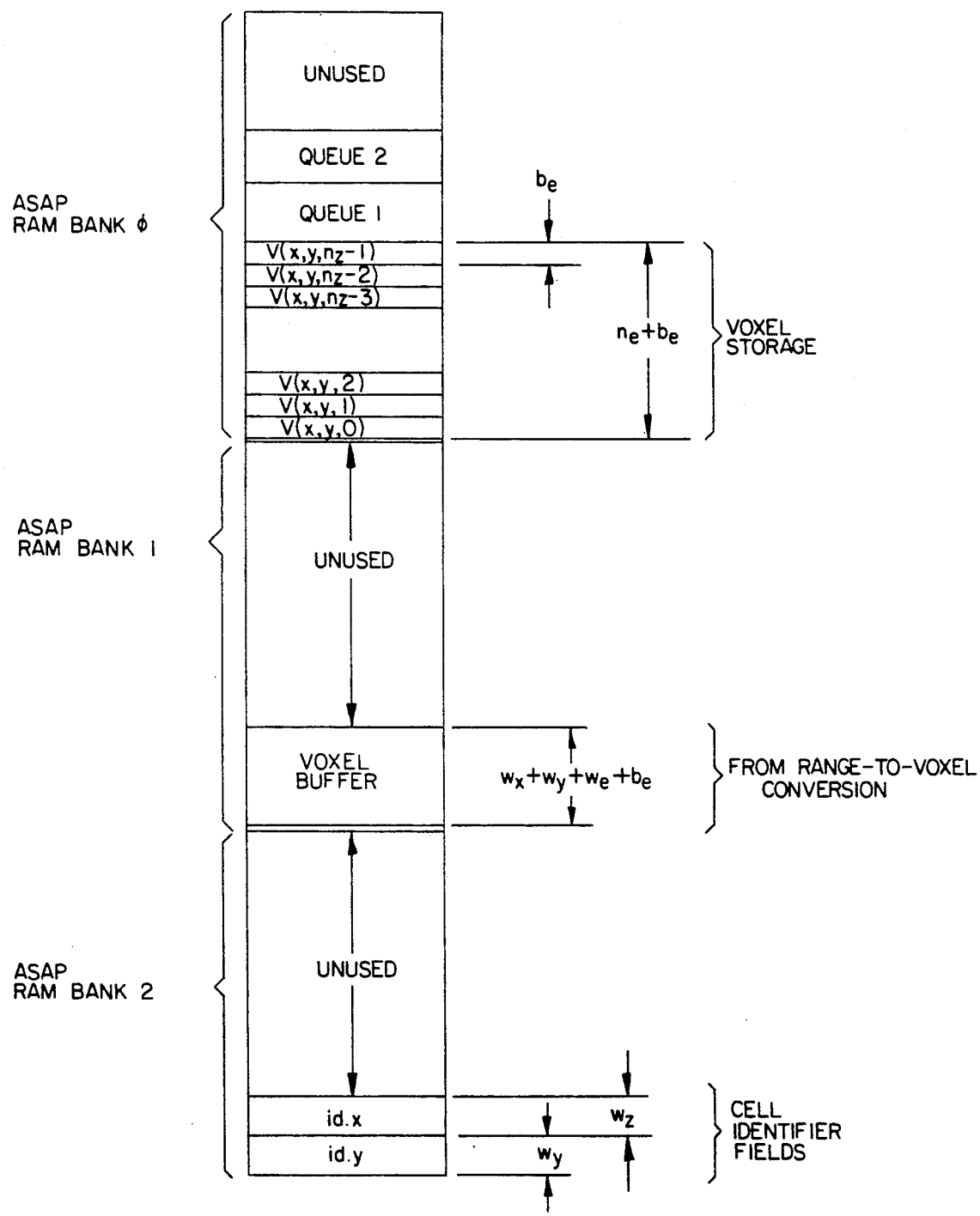
FIG. 16 is a map for a preferred organization of memory in a processing cell.

A preferred format for the output is shown in FIG. 15. This format includes a binary encoded location indicator (relative to an absolute base frame of reference) along with a binary encoded condition indicator. This condition indicator may be, for example, an indicator of the presence or absence of a sonar return if input device 40 is a sonar device (in which case it may be only one bit), or a tissue density value if input device 40 is a device such a CAT scanner (in which case it may be more than one bit). Controller 60 causes the voxel position and condition data to be broadcast over the CM path to all cells in an appropriate row. A memory map for a typical cell is shown in FIG. 16. Each cell has a unique identification code (x,y). Once voxel representational data is broadcast to a particular row, the cell's ALU compares the voxel identifier field with the cell identifier field. If there is a match, the ALU causes a logical one to be loaded into the AF register to signal that the cell is activated for writing.

The z field of the RVC output determines the location within RAM where the condition indicator is to be written. Each cell thus ultimately stores the projection along the z-axis for its coordinate pair (x,y).

Operations on Data Structure

With the image data thus stored, a great number of operations and transformations are greatly facilitated. The following paragraphs describe how such operations can be performed on the array three-dimensional data structure.

Packet Switching

Figure 17:
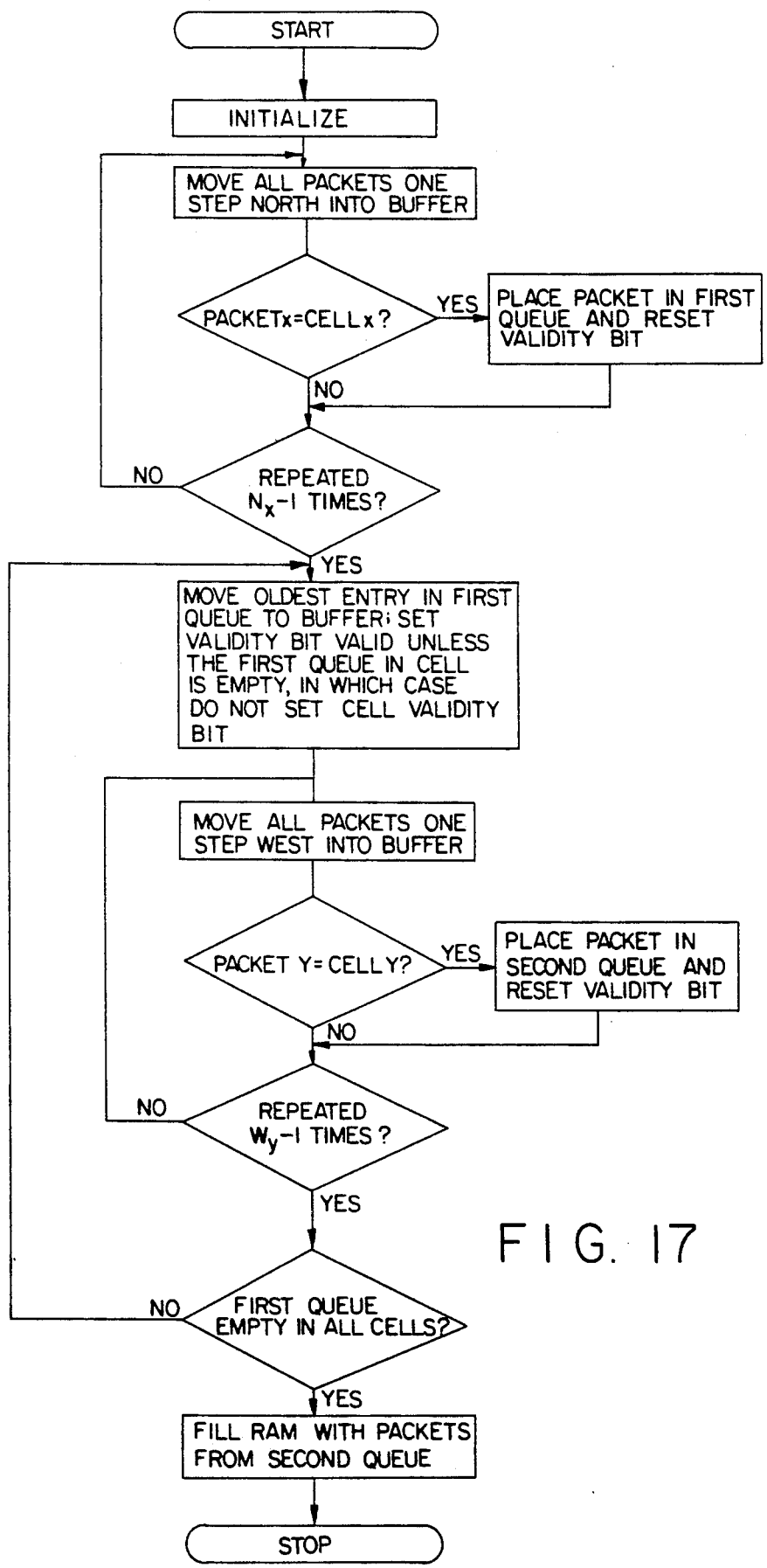
FIG. 17 is a flowchart for a packet switching operation according to the present invention.

A fundamental operation is the movement of data from any point in the array to any other point in the array under data control. For this operation, each cell is preferably provided with buffer area for storing data packets having a data field, an x value, a y value, and a validity bit for indicating that the buffer holds valid data. Each cell is also preferably provided with two queues, each with its own individual pointer. With these provisions packet switching may be implemented using the following method, which is also shown in flowchart form in FIG. 17:

1. initialize all cells in the array by creating a packet consisting of the data to be moved, the identifier (x,y) for its destination, and a validity bit, in the buffer;

2. move all packets north one step to the north neighboring buffer (the toroidal virtual configuration mentioned earlier is assumed);

3. compare the x value in the buffer with the cell's x-coordinate identifier, and, if there is a match and the buffer's validity bit is on, add the buffer data to the first queue and reset the buffer's validity bit; otherwise, do nothing;

4. repeat steps 2 and 3 ($n_x - 1$) times, where nx is the dimension of the array in the north-south direction (or, alternatively, until there are no remaining packets with validity bits which have not been reset);

5. move the oldest entry in the first queue into the packet buffer and set the validity bit valid, unless the first queue is empty in that cell, in which case do not set validity bit.

6. move all packets one step to the west neighboring buffer (the toroidal configuration being assumed also for the east-west direction);

7. compare the y value in the buffer with the cell's y-coordinate identifier, and, if there is a match and the buffer's validity bit is on, add the buffer data to the second queue and reset the buffer's validity bit;

8. repeat steps 6 and 7 ($n_y - 1$) times, where ny is the dimension of the array in the east-west direction (or, alternatively, until there are no remaining packets with validity bits which have not been reset); and 9. repeat steps 5-8 until the first queue is empty in all cells.

The result is that each cell has its second queue filled with data. This data can be processed as if it were input data from an RVC calculation. In other words, the data can be used to build a new voxel data structure based on the contents of the second queue.

Translation Operations

Translation in the x direction may be performed via a shift of data in the north-south direction. Translation in the y direction is performed via a shift in data in the east-west direction. Translation in the z direction is performed by movement of data in the RAM0 bank, which can be performed using global address control.

Rotation

Rotation about an axis corresponds to a mapping from an old set of coordinates to a new set of coordinates. Thus, to perform a rotation, a new set of coordinates must be calculated for the condition indicator for each voxel. The equations for calculating new coordinates from prior coordinates for a given rotation are shown in the following table:

ROTATION ABOUT X-AXIS BY $\theta$:

$$\begin{bmatrix} x_n \\ y_n \\ z_n \end{bmatrix} = \begin{bmatrix} 1 & 0 & 0 \\ 0 & \cos\theta & -\sin\theta \\ 0 & \sin\theta & \cos\theta \end{bmatrix} \begin{bmatrix} x_o \\ y_o \\ z_o \end{bmatrix}$$

ROTATION ABOUT Y-AXIS BY $\theta$:

$$\begin{bmatrix} x_n \\ y_n \\ z_n \end{bmatrix} = \begin{bmatrix} \cos\theta & 0 & \sin\theta \\ 0 & 1 & 0 \\ -\sin\theta & 0 & \cos\theta \end{bmatrix} \begin{bmatrix} x_o \\ y_o \\ z_o \end{bmatrix}$$

ROTATION ABOUT Z-AXIS BY $\theta$:

$$\begin{bmatrix} x_n \\ y_n \\ z_n \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} x_o \\ y_o \\ z_o \end{bmatrix}$$

These equations are for the example of left-hand cartesian coordinates with rotation about one axis. Each cell performs this calculation simultaneously. The cell then forms a packet containing the new coordinates and the condition indicator. These packets are then shifted using the packet switching operation described above.

Rotations about an arbitrary axis passing through the origin can be found by calculating the angles about the coordinate axes and multiplying the rotation matrices together. Note that the cosine and sine factors shown in FIG. 18 are not functions of $x_0$, $y_0$, and $z_0$. Thus, these sine and cosine factors can be calculated by the host CPU 50 and broadcast to all cells using the CM path (broadcast mode).

Sectioning

Sectioning of an object in the x-y plane is a trivial operation because the bit-planes of the array correspond to slices through space in the x-y plane. Sectioning in any other plane may be performed by rotating the image until the desired plane is coincides with the array x-y plane.

Two-dimensional Surface Projection

The surfaces of any three-dimensional object can be projected onto a two-dimensional plane. The preferred plane of projection is the x-y plane. One binary encoding is reserved for empty space. A RAM location in each cell is reserved for storing the projection. A preferred method for performing the projection may be programmed as follows:

projection <- empty_space
for i := 0 to ($n_z-1$) do
   if (voxel(i) <> empty_space) and (projection = empty_space) then projection <- voxel (i)

Thus the first nonempty voxel found in a particular direction is stored onto the projection plane.

Scaling

Scaling within tolerance bands amounts to calculating the transformed coordinates ($x_n$, $y_n$, $z_n$) and carrying out packet switching to move the condition indicators to their new locations. Thus, the overall procedure resembles that undertaken for rotation.

Matching Operations

By storing an input image simultaneously with a pattern image, a matching operation can be performed by comparing the corresponding condition indicators of the two images to obtain a measure of the degree of similarity of the two images.

Tomographic Feature Extraction

The system could be used to encode tissue density as the condition indicator. An object's total mass could be obtained by summing the density values (volume being well-defined), in a manner corresponding to a three-dimensional summation or integration approximation. It would also be possible to isolate tissue masses with unusual features (such as abnormal density) and locate and display them apart from surrounding tissue.

2½ Dimensional Image Reconstruction

In this operation, patches would be input from an RVC, then stored in the array. Patches could be accumulated until an entire image could be formed. For example, an autonomous mobile robot could navigate around an entire object collecting information which the system can fuse into a complete three-dimensional image data structure, while preserving conformity.

These are just some examples of operations which can be carried out using an apparatus and method according to the invention. It will be apparent to one having ordinary skill in the art that the list is not complete, and that many other operations are possible with the invention, including combinations of the foregoing operations.

Applications

The method and apparatus of the present invention are especially useful in several areas. An area of particular usefulness is in robot vision. An exemplary application in this area will now be discussed.

There is a need to provide an autonomous robot with vision-based capabilities such as obstacle avoidance, pathfinding, and image recognition. Referring again to FIG. 1, these capabilities may be realized if the input device 40 is a form of onboard image sensor such as an infrared sensor, a sonar sensor, or even a video input device such as a camera. The signals are provided to the I/O module 30 which, in cooperation with the host CPU 50 performs RVC operations and loads the data from the input device 40 into the array. The host CPU 50 in essence may construct a data model of the space under consideration in the conformal memory space of the array. It may then use this model to generate commands for the avoidance of obstacles by traversing a path determined by inspecting the spatial occupancy in memory space. The output device 70 may then be a motor controller for the autonomous robot.

This is only one application. It will be apparent to one having ordinary skill in the art the invention will prove useful in additional applications as well.

The present invention has been described above in terms of specific embodiments. It will be readily appreciated by one of ordinary skill in the art, however, that the invention is not limited to these embodiments, and that, in fact, the principles of the invention may be embodied and practiced in devices and methods other than those specifically described above. For example, it has already been mentioned that other geometries for quantization and the array may be useful. Quantization may also be such that the voxel characteristic length or resolution s may be a function of range rather than constant as long as each voxel in real space has a corresponding analog in the virtual memory space of the array, with the physical relative positioning and orientation of the voxels being implicitly mirrored in a virtual relative positioning and orientation of the memory space analogs. Therefore, the invention should not be regarded as being limited to these specific embodiments, but instead should be regarded as being fully commensurate in scope with the following claims.

What is claimed is:

1. An apparatus for storing data relating to a plurality of voxels in a three-dimensional space extending a characteristic number A of voxels in an a-dimension, a characteristic number B of voxels in a b-dimension, and a characteristic number C of voxels in a c-dimension comprising:

an array of N processing cells, N being the product of A and B, each of said cells being uniquely associated with a respective pair of coordinates a,b in said three-dimensional space and having a memory having a number of allocations at least equal to C and being capable of storing a condition indicator for each voxel having said coordinates a,b; and means connected to said array for storing said data relating to said voxels such that a cell associated with a given pair of coordinates a,b stores in said memory in a predetermined order said condition indicator for each voxel having said coordinates a,b.

2. An apparatus as claimed in claim 1 wherein said a-dimension and b-dimension are x and y dimensions, respectively, and wherein said array is an A by B rectangular array.

3. An apparatus as claimed in claim 1 wherein said condition is occupancy of the voxel by at least part of an object.

4. An apparatus as claimed in claim 1 further comprising means connected to said array for generating said condition indicator for each voxel.

5. An apparatus as claimed in claim 4 wherein said generating means comprises means connected to said array for sensing a position of an object in said three-dimensional space and for generating as said condition indicator for each voxel an indication of whether said each voxel is occupied by at least part of said object.

6. An apparatus as claimed in claim 5 further comprising means, connected to said array, for controlling data flow within and between said cells to correspond to operations on said object.

7. An apparatus comprising:

means for providing data including a condition indicator indicating a condition of a voxel at coordinates $a_1$, $b_1$, $c_1$ in directions a, b, c, respectively;

an array of M processing cells, M being the product of a number of voxels $N_a$ along direction a and a number of voxels $N_b$ along direction b, each of said cells corresponding to a particular coordinate pair $a_m$, $b_n$, respectively, m and n each being an integer not greater than $N_a$ and $N_b$, respectively, each of said cells having a memory capable of storing $N_c$ condition indicators related to a particular pair $a_m$, $b_n$ of coordinates, $N_c$ being a number of voxels along direction c; and means, responsive to said data providing means and connected to said array, for loading said condition indicator into a $c_1$th address in said memory of said cell associated with coordinates $a_1$, $b_1$.

8. An apparatus as claimed in claim 7 wherein said a and b directions correspond to x and y directions, respectively, and wherein said array comprises an $N_a$ by $N_b$ rectangular array.

9. An apparatus as claimed in claim 7, wherein said data providing means comprises means for sensing said condition of said voxel at said coordinates $a_1$, $b_1$, $c_1$ and for generating said condition indicator indicative of the sensed condition.

10. An apparatus as claimed in claim 9 wherein said condition is occupancy of the voxel by at least part of an object.

11. An apparatus as claimed in claim 10 further comprising means, connected to said array, for controlling data flow within and between said cells to correspond to operations on said object.

12. An apparatus comprising:

means for providing positional data indicative of three coordinates a,b,c of each of a plurality of voxels forming at least part of a predetermined three-dimensional space, and for generating a condition indicator indicative of a condition of each of said voxels, respectively;

an array of M processing cells, M being the product of a number of voxels $N_a$ having a differing set of a coordinates and a number of voxels $N_b$ having a differing set of b coordinates for said predetermined three-dimensional space, each of said cells having a memory capable of storing $N_c$ condition indicators related to a particular pair a,b of coordinates not greater than $N_a$ and $N_b$, respectively, corresponding to said cell, $N_c$ being a number of voxels having a differing set of c coordinates in said three-dimensional space; and means, responsive to said data providing means and connected to said array, for loading said condition indicators into said array such that a cell corresponding to a given pair of coordinates a,b stores in said memory in a predetermined order said condition indicators associated with said coordinate pair a,b.

13. An apparatus as claimed in claim 12 wherein said coordinates a,b, and c correspond to x,y, and z coordinates, and wherein said array comprises an $N_a$ by $N_b$ rectangular array.

14. An apparatus as claimed in claim 12 wherein said data providing means comprises:

means for sensing the conditions of said plurality of voxels forming at least part of said predetermined three-dimensional space, and for generating signals indicative of the sensed conditions; and means, responsive to said sensing means, for converting said signals for each voxel into said positional digital data indicative of the three coordinates a,b,c of each of said voxels and the condition indicators indicative of the sensed condition of each of said voxels.

15. An apparatus as claimed in claim 14 wherein said condition of each of said voxels is occupancy of said each of said voxels by at least part of an object.

16. An apparatus as claimed in claim 15 further comprising means, connected to said array, for controlling data flow within and between said cells to correspond to operations on said object.

17. An apparatus for gathering and manipulating data relating to a position and configuration of an object in a three-dimensional space extending a characteristic number $N_a$ voxels in an a-dimension and a characteristic number $N_b$ voxels in a b-dimension, comprising:

an array of processing cells each uniquely associated with a respective pair of coordinates a,b and having a memory capable of storing an indication of whether a portion of said object occupies a voxel having coordinates a,b,c at a cth address in said memory; and means connected with said array for storing said indication at said cth address of said memory of said cell associated with said coordinate pair a,b.

18. An apparatus as claimed in claim 17 wherein said a and b dimensions correspond to x and y dimensions, respectively, and wherein said array is an $N_a$ by $N_b$ rectangular array.

19. An apparatus as claimed in claim 17 further comprising:

means for sensing surface portions of said object; and means, responsive to said sensing means, for generating an indication for each voxel at x,y,z whether said surface portion occupies said voxel.

20. An apparatus for gathering and manipulating data relating to a position and configuration of an object in a three-dimensional space extending a characteristic number $N_x$ of voxels in an x-dimension and a characteristic number $N_y$ of voxels in a y-dimension, comprising:

means for sensing portions of said object and for generating signals indicative of x, y, and z coordinates of said portions;

a rectangular $N_x$ by $N_y$ array of processing cells each uniquely associated with a respective pair of coordinates x,y and having a memory capable of storing an indication of whether said portion occupies a voxel having coordinates x,y,z at a zth address in said memory:

means, connected to said sensing means and said array, and responsive to said signals, for generating said indication for each voxel at x,y,z and for storing said indication at said zth address of said memory of said cell associated with said coordinate pair x,y; and means, connected to said array, for controlling data storage in and between said cells in such a manner as to correspond to operations on said object in said space.

21. An apparatus as claimed in claim 20 wherein said operation comprises translation.

22. An apparatus as claimed in claim 20 wherein said operation comprises rotation.

23. An apparatus as claimed in claim 20 wherein said operation comprises magnification.

24. An apparatus comprising:

means for generating a plurality of binary encoded condition indicators, each for a respective one of a like number of physical volume elements at known physical relative positions and orientations, each of said condition indicators being indicative of a predefined condition of the respective physical volume element; and a memory, responsive to said generating means, and having a like number of virtual memory elements each at a virtual relative position and orientation corresponding to said physical relative position and orientation of a respective one of said plurality of physical volume elements, for conformally storing at each of said virtual memory elements the condition indicator for said respective one of said plurality of physical volume elements so that relative positioning and orientation of said condition indicators is implicitly preserved.

25. A method of storing data relating to a plurality of voxels in a three-dimensional space extending a characteristic number $N_a$ of voxels in an a-dimension, a characteristic number $N_b$ of voxels in a b-dimension, and a characteristic number $N_c$ of voxels in a c-dimension, comprising the step of:

storing said data relating to said voxels in an array of M processing cells, M being the product of $N_a$ and $N_b$, each of said cells being uniquely associated with a respective pair of coordinates a,b in said three-dimensional space and having a memory having a number of allocations at least equal to $N_c$ and being capable of storing a condition indicator for each voxel having said coordinates a,b such that a cell associated with a given pair of coordinates a,b stores in said memory in a predetermined order said condition indicator for each voxel having said coordinates a,b.

26. A method as claimed in claim 25 further comprising a step, before said storing step, of acquiring said data.

27. A method as claimed in claim 26 wherein said acquiring step comprises the steps of:

sensing a condition of each of said voxels; and generating said condition indicator for each voxel on the basis of the sensed condition of each voxel.

28. A method as claimed in claim 27 further comprising the step, after said storing step, of controlling data flow within and between cells to correspond to operations in said three-dimensional space.

29. A method comprising the steps of:

providing data including a condition indicator indicating a condition of a voxel at coordinates $a_1$, $b_1$, $c_1$ in directions a, b, c, respectively; and loading said data into an array of M processing cells, M being the product of a number of voxels $N_a$ along direction a and a number of voxels $N_b$ along direction b, each of said cells corresponding to a particular coordinate pair $a_m$, $b_n$, m and n each being an integer not greater than $N_a$ and $N_b$, respectively, each of said cells having a memory capable of storing $N_c$ condition indicators related to a particular pair $a_m$, $b_n$ of coordinates, $N_c$ being a number of voxels along direction c, such that said condition indicator is stored in a $c_1$th address in said memory of said cell associated with coordinates $a_1$, $b_1$.

30. A method as claimed in claim 29 wherein said providing step comprises the steps of:

sensing said condition of said voxel at said coordinates $a_1$, $b_1$, $c_1$; and generating said condition indicator indicative of the sensed condition.

31. A method as claimed in claim 30 further comprising the step, after said loading step, of controlling data flow within and between cells to correspond to operations in said three-dimensional space.

32. A method comprising the steps of:

providing positional data indicative of three coordinates a,b,c of each of a plurality of voxels forming at least part of a predetermined three-dimensional space, and a condition indicator indicative of a condition of each of said voxels; and loading said positional data and condition indicators into an array of M processing cells, M being the product of a number $N_a$ of voxels having a differing set of a coordinates and a number $N_b$ of voxels having a differing set of b coordinates, each of said cells having a memory capable of storing $N_c$ condition indicators related to a particular pair a,b of coordinates corresponding to said cell, $N_c$ being a number of voxels having a differing set of c coordinates, such that a cell corresponding to a given pair of coordinates a,b stores in said memory in a predetermined order said condition indicators associated with said coordinate pair a,b.

33. A method as claimed in claim 32 wherein said condition of said each of said voxels is occupancy of the voxel by at least part of an object.

34. A method as claimed in claim 32 wherein said data providing step comprises the steps of:

sensing the conditions of said plurality of voxels forming at least part of said predetermined three-dimensional space:

generating signals indicative of the sensed conditions; and converting said signals for each voxel into said positional digital data indicative of the three coordinates a,b,c of each of said voxels and the condition indicators indicative of the sensed condition of each of said voxels.

35. A method as claimed in claim 34 further comprising the step, after said loading step, of controlling data flow within and between cells to correspond to operations in said three-dimensional space.

36. A method for gathering and manipulating data relating to a position and configuration of an object in a three-dimensional space extending a characteristic number $N_x$ of voxels in an x-dimension and a characteristic number $N_y$ of voxels in a y-dimension, comprising the steps of:

sensing portions of said object;

generating an indication for the voxel at each x,y,z whether said portion occupies said voxel;

storing said indication in a rectangular $N_x$ by $N_y$ array of processing cells each uniquely associated with a respective pair of coordinates x,y and having a memory capable of storing an indication of whether said portion occupies a voxel having coordinates x,y,z at a zth address in said memory, at said zth address of said memory of said cell associated with said coordinate pair x,y; and controlling further data storage in and between said cells in such a manner as to correspond to operations on said object in said space.

37. A method as claimed in claim 36 wherein said controlling step comprises controlling transfer in and between cells in such a manner as to correspond to translation of said object in said space.

38. A method as claimed in claim 36 wherein said controlling step comprises controlling transfer in and between cells in such a manner as to correspond to rotation of said object in said space.

39. A method as claimed in claim 36 wherein said controlling step comprises controlling transfer in and between cells in such a manner as to correspond to magnification of said object in said space.

* * * * *